(12) United States Patent
Akiyama et al.

(10) Patent No.: US 7,873,283 B2
(45) Date of Patent: Jan. 18, 2011

(54) METHOD OF MONITORING OPTICAL SIGNAL TO NOISE RATIO AND OPTICAL TRANSMISSION SYSTEM USING THE SAME

(75) Inventors: Yuichi Akiyama, Kawasaki (JP); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 878 days.

(21) Appl. No.: 10/662,394

(22) Filed: Sep. 16, 2003

(65) Prior Publication Data

US 2004/0067057 A1 Apr. 8, 2004

(30) Foreign Application Priority Data

Sep. 19, 2002 (JP) ............................. 2002-273137

(51) Int. Cl.
*G01J 3/28* (2006.01)
*H04B 10/08* (2006.01)

(52) U.S. Cl. .................. 398/147; 398/152; 398/159

(58) Field of Classification Search .................. 398/26, 398/29, 81, 147–150, 158, 159, 192–195, 398/208–211
See application file for complete search history.

(56) References Cited

U.S. PATENT DOCUMENTS

| | | | | |
|---|---|---|---|---|
| 5,327,511 A | * | 7/1994 | Heismann et al. | 385/1 |
| 5,659,412 A | * | 8/1997 | Hakki | 398/152 |
| 5,815,270 A | * | 9/1998 | Lee | 356/367 |
| 5,930,414 A | * | 7/1999 | Fishman et al. | 385/11 |
| 5,949,560 A | * | 9/1999 | Roberts et al. | 398/29 |
| 5,986,746 A | * | 11/1999 | Metz et al. | 356/71 |
| 5,994,898 A | * | 11/1999 | DiMarzio et al. | 324/244.1 |
| 6,097,525 A | * | 8/2000 | Ono et al. | 398/185 |
| 6,130,766 A | * | 10/2000 | Cao | 398/147 |
| 6,154,273 A | * | 11/2000 | Suzuki | 356/73.1 |
| 6,310,709 B1 | * | 10/2001 | Bergano | 398/185 |
| 6,317,240 B1 | * | 11/2001 | Penninckx et al. | 398/147 |
| 6,385,356 B1 | * | 5/2002 | Jopson et al. | 385/11 |
| 6,421,153 B1 | * | 7/2002 | Way et al. | 398/152 |

(Continued)

FOREIGN PATENT DOCUMENTS

JP 10-271066 10/1998

(Continued)

OTHER PUBLICATIONS

Morkel, P.R., "PMD-induced BER penalties in optically-amplified IM/DD lightwave systems", IEEE Electronics Letters, May 12, 1994, vol. 30, Iss 10, p. 806-807.*

(Continued)

*Primary Examiner*—Ken N Vanderpuye
*Assistant Examiner*—Danny W. Leung
(74) *Attorney, Agent, or Firm*—Staas & Halsey LLP

(57) ABSTRACT

The invention aims to provide a monitoring method that can measure an optical SNR in an ultra high speed optical transmission system with high accuracy, and an optical transmission system using the same. To this end, in the optical transmission system to which the monitoring method of the present invention is applied, the degree of polarization of an optical signal transmitted from an optical transmission apparatus to an optical receiving apparatus via an optical transmission path is measured by a DOP measuring device, and an optical SNR of the optical signal is determined by an optical SNR calculation circuit based on a measured value of the degree of polarization.

11 Claims, 24 Drawing Sheets

U.S. PATENT DOCUMENTS

| | | | |
|---|---|---|---|
| 6,512,612 B1 * | 1/2003 | Fatehi et al. | 398/49 |
| 6,570,682 B2 * | 5/2003 | Robinson et al. | 398/20 |
| 6,631,221 B2 * | 10/2003 | Penninckx et al. | 385/11 |
| 6,654,105 B2 * | 11/2003 | Wang et al. | 356/73.1 |
| 6,671,045 B1 * | 12/2003 | Lee et al. | 356/364 |
| 6,671,464 B1 * | 12/2003 | Kikuchi | 398/65 |
| 6,678,431 B2 * | 1/2004 | Han et al. | 385/11 |
| 6,681,081 B2 * | 1/2004 | Mao | 398/147 |
| 6,690,454 B2 * | 2/2004 | Kennedy et al. | 356/73.1 |
| 6,707,541 B1 * | 3/2004 | Noe | 356/73.1 |
| 6,710,904 B1 * | 3/2004 | Penninckx et al. | 398/111 |
| 6,765,670 B2 * | 7/2004 | Olsson et al. | 356/327 |
| 6,792,168 B2 * | 9/2004 | Lanne et al. | 385/11 |
| 6,807,321 B2 * | 10/2004 | Madsen | 385/11 |
| 6,813,021 B2 * | 11/2004 | Chung et al. | 356/364 |
| 6,859,268 B2 * | 2/2005 | Chou et al. | 356/73.1 |
| 6,885,820 B2 * | 4/2005 | Eder et al. | 398/26 |
| 6,895,188 B1 * | 5/2005 | Shi et al. | 398/147 |
| 6,901,225 B1 * | 5/2005 | Noe | 398/206 |
| 6,912,359 B2 * | 6/2005 | Blumenthal et al. | 398/29 |
| 6,934,433 B2 * | 8/2005 | Miyata et al. | 385/16 |
| 6,934,479 B2 * | 8/2005 | Sakamoto et al. | 398/193 |
| 6,947,194 B2 * | 9/2005 | Matsumoto et al. | 359/280 |
| 6,950,611 B2 * | 9/2005 | Erdogan et al. | 398/152 |
| 7,006,736 B2 * | 2/2006 | Lee et al. | 385/47 |
| 7,024,058 B2 * | 4/2006 | Han et al. | 385/11 |
| 7,024,111 B2 * | 4/2006 | Knox et al. | 398/25 |
| 7,027,198 B2 * | 4/2006 | Yao | 359/259 |
| 7,030,973 B2 * | 4/2006 | Rasmussen et al. | 356/73.1 |
| 7,043,122 B2 * | 5/2006 | Han et al. | 385/37 |
| 7,050,658 B2 * | 5/2006 | Chung et al. | 385/1 |
| 7,067,795 B1 * | 6/2006 | Yan et al. | 250/225 |
| 7,142,736 B2 * | 11/2006 | Patel et al. | 385/12 |
| 7,203,428 B2 * | 4/2007 | Waarts et al. | 398/204 |
| 7,206,522 B2 * | 4/2007 | Garcia et al. | 398/206 |
| 7,218,436 B2 * | 5/2007 | Yao | 359/259 |
| 7,256,876 B1 * | 8/2007 | Boroditsky et al. | 356/73.1 |
| 7,308,204 B2 * | 12/2007 | Hayashi et al. | 398/152 |
| 2001/0008452 A1 * | 7/2001 | Sugihara et al. | 359/124 |
| 2001/0028760 A1 * | 10/2001 | Yaffe | 385/27 |
| 2002/0018265 A1 * | 2/2002 | Graves | 359/128 |
| 2002/0018266 A1 * | 2/2002 | Ooi et al. | 359/161 |
| 2002/0024704 A1 * | 2/2002 | Erdogan et al. | 359/156 |
| 2003/0202795 A1 * | 10/2003 | Garcia et al. | 398/147 |
| 2004/0067057 A1 * | 4/2004 | Akiyama et al. | 398/26 |
| 2004/0202480 A1 * | 10/2004 | Weid et al. | 398/147 |
| 2006/0245680 A1 * | 11/2006 | Rasmussen et al. | 385/11 |

FOREIGN PATENT DOCUMENTS

| | | |
|---|---|---|
| JP | 2001-168813 | 6/2001 |
| JP | 2001-203637 | 7/2001 |
| JP | 2002-016548 | 1/2002 |
| JP | 2002-57624 | 2/2002 |

OTHER PUBLICATIONS

Andrew Lord, "Power budgeting for long-haul optical amplified systems" Jan. 28, 1994, The Institution of Electrical Engineers.*

Taihei Miyakoshi et al., "A study for wavelength dependency of Polarization Analysis Module", Institute of Electronics, Information and Communication Engineers General Meeting 2001, p. 528, including translation, 3 pages.

Japanese Patent Office Action, mailed Apr. 17, 2007, and issued in corresponding Japanese Patent Application No. 2002-273137.

* cited by examiner

METHOD OF MONITORING OPTICAL SIGNAL TO NOISE RATIO AND OPTICAL TRANSMISSION SYSTEM USING THE SAME

BACKGROUND OF THE INVENTION (1) Field of the Invention

The present invention relates to a technique for monitoring an optical signal to noise ratio in an optical transmission system. In particular, the invention relates to a method of monitoring an optical signal to noise ratio based on the degree of polarization of an optical signal, and an optical transmission system using the same.

(2) Description of Related Art

Recently, optical wavelength division multiplexing transmission systems of 10 Gb/s (gigabits/second) have started to come into practical use. However, due to the recent rapid increase in network usage, the further increase of capacity and the ultra long distance of network are required, and research and development of optical wavelength division multiplexing transmission systems with transmission speeds of 40 Gb/s or higher per wavelength have been carried out actively inside and outside of Japan. In order to realize such an ultra long distance optical transmission system of 40 Gb/s or higher, it is important to ensure an optical signal to noise ratio (referred to hereunder as optical SNR) and to improve stability thereof. Specifically, in optical transmission systems with a transmission speed per wavelength of 40 Gb/s or higher, since an optical SNR is deteriorated theoretically compared with optical transmission systems of 10 Gb/s, such that for example, the optical SNR at 40 Gb/s transmission is deteriorated by 6 dB relative to an optical SNR at 10 Gb/s transmission, it is essential to ensure a high optical SNR in order to realize the ultra long distance optical transmission.

In general, in order to ensure a required optical SNR in the whole of an optical transmission system, the introduction of various techniques of, for example, setting an optical output power of a transmission terminal (that is, optical input power to an optical transmission path) to be higher in a range in which waveform deterioration due to a self phase modulation (SPM) effect does not occur, adequately considering the configuration of the transmission terminal, or applying Raman amplifiers to repeater nodes, are effective, and implementation of these techniques in optical transmission systems of 40 Gb/s or higher has been investigated actively.

However, even if the techniques as described above are introduced, since there is no margin for the required optical SNR in the optical transmission system of 40 Gb/s or higher, a technique for monitoring an optical SNR is important for ensuring a high optical SNR and maintaining stability thereof, at the time of operating the system. A spectrum analyzer unit (SAU) or the like is used, for example, as means for monitoring the optical SNR in a conventional optical transmission system.

Incidentally, one factor limiting a transmission distance in the optical transmission system of 40 Gb/s or higher is polarization-mode dispersion (to be referred to hereunder as PMD). PMD is a phenomenon wherein a group delay difference is caused between two cross polarization mode components since a core shape of transmission fiber is slightly elliptical, thus causing waveform deterioration. To be specific, in old fibers installed in mainly the overseas, there are some fibers having a large PMD value exceeding 0.5 to 2 ps/√km per unit length, and the transmission distance at 40 Gb/s optical transmission is limited to approximately 3 to 50 km if the worst PMD value is assumed to be three times an average.

In such a transmission path environment, in order to realize long distance transmission of optical signal at 40 Gb/s or higher, since the generated PMD is changed with time according to a change in the transmission path environment, such as temperature, stress and the like, it is necessary to monitor the polarization of the optical signal while the system is operating, to compensate for the PMD dynamically, and hence a PMD compensation technique has been proposed to deal with it (refer to Japanese Unexamined Patent Publication No. 2002-16548).

However in many cases, for the purposes of miniaturization and low cost, the spectrum analyzer unit used to monitor the optical SNR in the optical transmission system as described above, has only a function targeted to detect the power of optical signal, but has a problem in measurement accuracy at 40 Gb/s or higher optical transmission, which requires the optical SNR to be monitored with high accuracy. Furthermore, considering dynamic PMD compensation, it is necessary to provide a unit to monitor the polarization of optical signal in addition to the above-described spectrum analyzer unit, which will make the system configuration complicated and expensive.

SUMMARY OF THE INVENTION

The present invention has been achieved in view of the above-described points, with an object of realizing a monitoring method that can measure with high accuracy an optical SNR in an ultra high speed optical transmission system, and furthermore, with another object of providing an optical transmission system that can ensure in stable, a high optical SNR by using the monitoring method.

In order to achieve the above objects, a method of monitoring an optical SNR according to the present invention is constituted to measure the degree of polarization (DOP) of an optical signal transmitted through an optical transmission system, and determines the optical SNR of the transmitted light based on the measured degree of polarization.

The abovementioned degree of polarization is a value indicating how much a light is polarized, and indicates the rate of the power of polarized component to the total average of optical signal power as a percentage. To be specific, it can be expressed by the following equation (1).

$$DOP(\%) = \frac{\text{polarized output power}}{\text{total output power}} \times 100 \qquad (1)$$

Since the degree of polarization of an optical signal transmitted through an optical transmission system is changed corresponding to an optical SNR of the optical signal, it is possible to determine a change amount of the optical SNR based on a change amount of measured value of the degree of polarization. By determining the optical SNR based on the degree of polarization of the transmitted light in this manner, it is possible to monitor the optical SNR of the transmitted light with high accuracy.

An optical transmission system of the present invention, in which an optical signal is transmitted from an optical transmission apparatus to an optical receiving apparatus via an optical transmission path, comprises a degree of polarization measurement section that measures the degree of polarization of the optical signal, and an optical SNR calculation section that determines an optical SNR of the optical signal based on a measured value of the degree of polarization obtained in the degree of polarization measuring section.

In such a constitution, the degree of polarization of the optical signal transmitted from the optical transmission apparatus to the optical receiving apparatus via the optical transmission path is measured by the degree of polarization measurement section, and the optical SNR of the optical signal is determined by the optical SNR calculation section with high accuracy.

Furthermore, in the case where the above-described optical transmission system includes an automatic polarization mode dispersion compensation apparatus, the optical SNR of the optical signal may be monitored based on the degree of polarization measured by a degree of polarization measuring device in the automatic polarization mode dispersion compensation apparatus, instead of the degree of polarization measured by the degree of polarization measuring section. In such a constitution, it is possible to utilize, for monitoring the optical SNR, the degree of polarization measuring device provided for automatic compensation of polarization mode dispersion, thus enabling simplification and reduction of cost of the system configuration.

Moreover, the above-described optical transmission system may be provided with a control section that controls the power of the optical signal output from the optical transmission apparatus based on the optical SNR determined by the optical SNR calculation section, so that the optical SNR of the optical signal received in the optical receiving apparatus is a previously set value. By providing such a control section, it is possible to ensure a required optical SNR for the optical signal received by the optical receiving apparatus stably.

Other objects, features and advantages of this invention will become apparent from the following description of embodiments in conjunction with the appended drawings.

DETAILED DESCRIPTION OF THE INVENTION

Hereunder is a description of embodiments of the present invention based on drawings.

Figure 1:
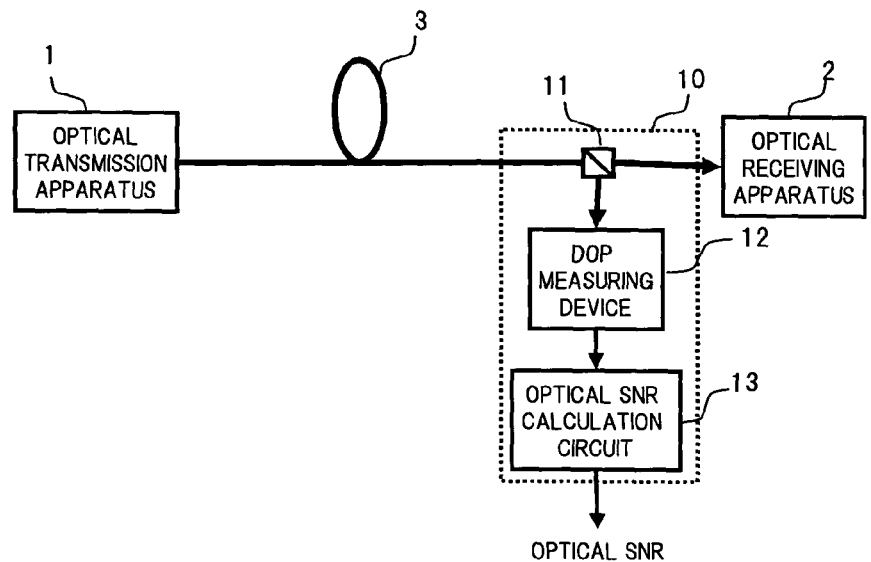
FIG. 1 is a block diagram showing a first embodiment of an optical transmission system to which an optical SNR monitoring method according to the present invention is applied.

FIG. 1 is a block diagram showing a first embodiment of an optical transmission system to which an optical SNR monitoring method of the present invention is applied.

The system shown in FIG. 1 comprises, for example, an optical transmission apparatus 1 and an optical receiving apparatus 2, an optical transmission path 3 connecting between them, and an optical SNR monitoring apparatus 10 for monitoring an optical SNR of an optical signal which is propagated through the optical transmission path 3 to be sent the optical receiving apparatus 2. Furthermore, the optical SNR monitoring apparatus 10 includes, for example, an optical coupler 11 branching a part of the optical signal propagated through the optical transmission path 3 as a monitoring light, a DOP measuring device 12 measuring the degree of polarization of the monitoring light branched by the optical coupler 11, and an optical SNR calculation circuit 13 determining the optical SNR of the optical signal based on the degree of polarization measured by the DOP measuring device 12.

Figure 2:
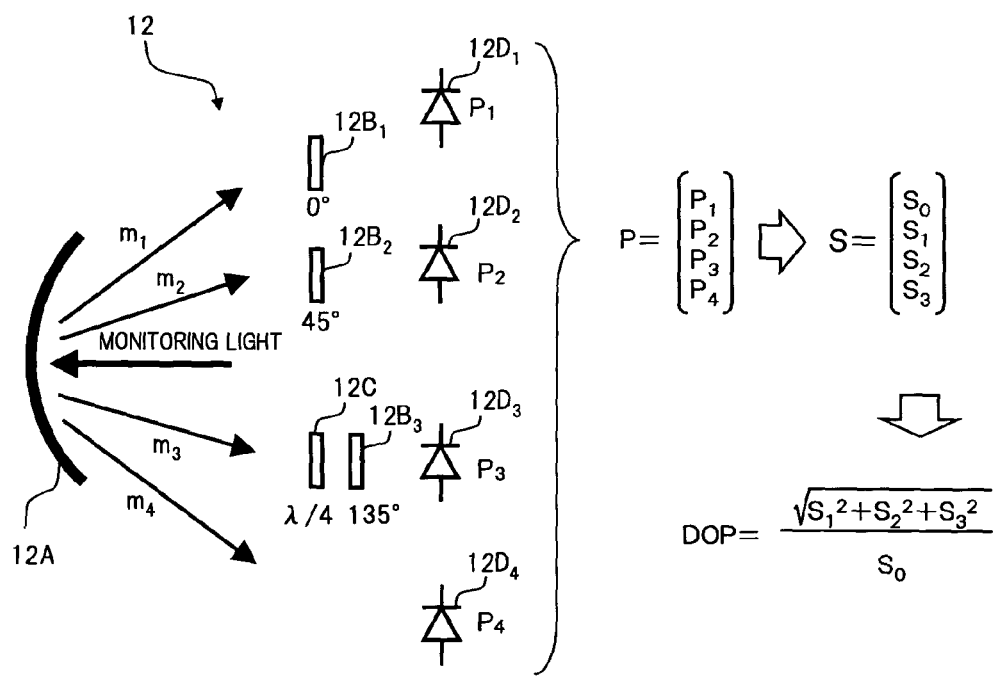
FIG. 2 is a diagram for explaining a specific configuration example of a DOP measuring device and a measuring method thereof in the first embodiment.

FIG. 2 is a diagram for explaining a specific configuration example of the DOP measuring device 12 and a measuring method thereof.

The DOP measuring device 12 shown in FIG. 2 is configured such that the monitoring light branched by the optical coupler 11 is reflected using a mirror 12A, to be branched into four lights, $m_1$, $m_2$, $m_3$ and $m_4$, the lights $m_1$ to $m_4$ are sent to light receivers $12D_1$, $12D_2$, $12D_3$ and $12D_4$ via polarizing plates $12B_1$, $12B_2$, and $12B_3$ or a wave plate $12C$, and each of the optical powers $P_1$ to $P_4$ of the lights $m_1$ to $m_4$ is detected to measure the degree of polarization. To be specific, here, the light $m_1$ reflected by the mirror 12A passes through the polarizing plate $12B_1$ whose main axis angle is 0°, to be received by the light receiver $12D_1$, and its power $P_1$ is measured. The light $m_2$ passes through the polarizing plate $12B_2$ whose main axis angle is 45°, to be received by the light receiver $12D_2$, and its power $P_2$ is measured. Furthermore, the light $m_3$ passes sequentially through the $\lambda/4$ plate 12C and the polarizing plate $12B_3$ whose main axis angle is 135°, to be received by the light receiver $12D_3$, and its power $P_3$ is measured, and the light $m_4$ is received directly by the light receiver $12D_4$, and its power $P_4$ is measured.

The light powers $P_1$ to $P_4$ measured by the light receivers $12D_1$ to $12D_4$ are respectively converted into Stokes parameters $S_0$ to $S_3$, which describe the polarization of optical signals as shown on the right of FIG. 2. Here, $S_0$ denotes the whole power, $S_1$ denotes a power difference between horizontal and vertical linearly polarized components, $S_2$ denotes a power difference between +45° and −45 linearly polarized components, and $S_3$ denotes a power difference between right-handed and left-handed circularly polarized components. Then, the degree of polarization of the optical signal is obtained by the following equation (2) using the Stokes parameters $S_0$ to $S_3$ as described above.

$$DOP = \frac{\sqrt{(S_1^2 + S_2^2 + S_3^2)}}{S_0} \quad (2)$$

Here, an example of a monitoring configuration as shown in FIG. 2 is described. However, the configuration of DOP measuring device applicable to the present invention is not limited thereto. For example, for another DOP measuring device configuration, it is possible to use a configuration shown in a document: Taihei Miyakoshi and three others, "Research of Wavelength Dependency of Polarization Analysis Module", Institute of Electronics, Information and Communication Engineers General Meeting 2001, B-10-95, and according to this configuration, it is possible to achieve miniaturization of a monitoring device and highly accurate measurement.

The optical SNR calculation circuit 13 calculates the optical SNR of the optical signal propagated through the optical transmission path 3 based on the relationship between the degree of polarization and the optical SNR, as described later, using the degree of polarization measured by the DOP measuring device 12, and outputs a signal indicating a calculation result to the outside or the like.

Here, is a description of the relationship between the degree of polarization and an optical SNR of an optical signal transmitted between an optical transmission apparatus and an optical receiving apparatus, in a typical optical transmission system.

A signal light is output from the optical transmission apparatus as a linearly polarized light, and transmitted through an optical fiber. This optical fiber converts the linearly polarized light into a light in a predetermined polarization due to structural distortion of a core in the lengthwise direction or non-uniformity of material. Ideally, if the polarization is fixed in the predetermined polarization, then the degree of polarization is 100%.

On the other hand, a light being the noise is dominated by amplified spontaneous emission light (ASE light) generated from optical amplifiers provided in the middle of the optical fiber being a transmission path, which is a non-polarized light.

Figure 3:
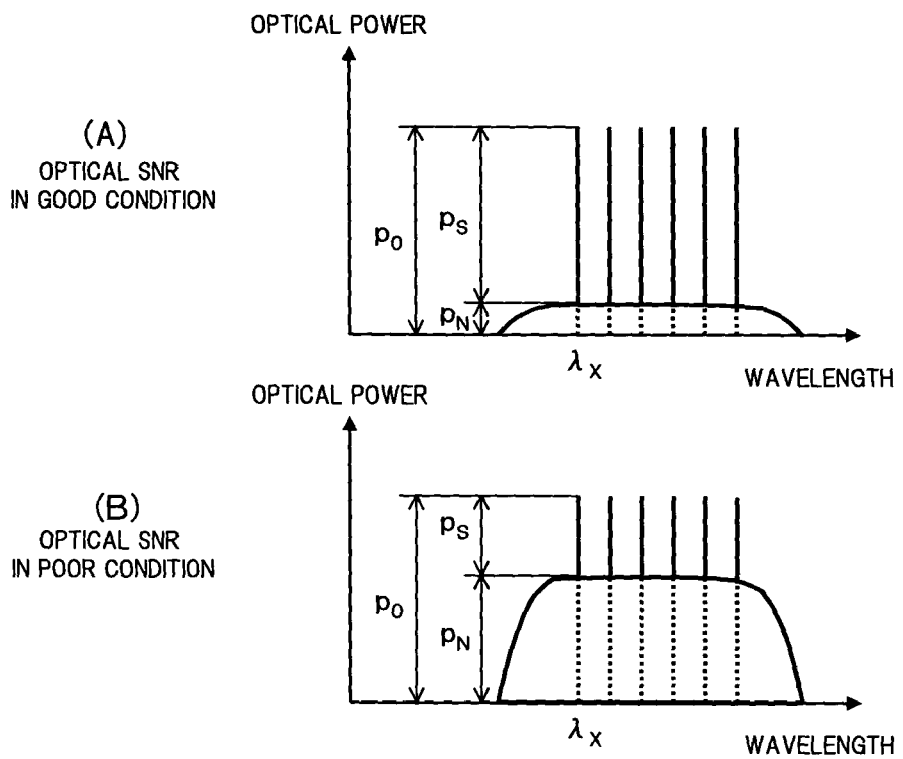
FIG. 3 is an explanatory diagram showing an example of a relationship between the degree of polarization and an optical SNR in a typical optical transmission system.

Here, defining the signal light as a light having a specific polarization, and the noise light as non-polarized light, then considering a light with a specific wavelength $\lambda_x$, a spectrum diagram in FIG. 3 is seen. In FIG. 3, (A) shows an example with the optical SNR in a good condition, and (B) shows the optical SNR in a poor condition. Furthermore, $p_0$ represents the total power of light with a wavelength $\lambda_x$, $P_s$ represents the power of light with a specific polarization, and $P_N$ represents the power of non-polarized light (noise light).

When the optical SNR is in a good condition as shown in (A) of FIG. 3, the optical power $P_N$ of the non-polarized light is small, and the optical power $p_s$ with a specific polarization is large. If the light with such a wavelength $\lambda_x$ is detected in the system of FIG. 2, the total power $S_o$ of the light with the wavelength $\lambda_x$ is $p_0$, and subtracting the optical power $P_N$ of the non-polarized light from the total power $p_0$ feeds the optical power component of the specific polarization, that is, the degree of polarization can be obtained according to $P_s$.

When the optical SNR is in a poor condition as shown in (B) of FIG. 3, compared with when it is in a good condition as in the above-described (A), the optical power $P_N$ of the non-polarized light is large, and the optical power $p_s$ of the specific polarization is small. Therefore, the degree of polarization obtained in the system of FIG. 2 is smaller than a value when the optical SNR is in a good condition.

That is, if the power of the noise light becomes large, and the optical SNR is deteriorated, then the degree of polarization becomes small. Accordingly, it is possible to measure the optical SNR by measuring the degree of polarization.

Figures 4, 5:
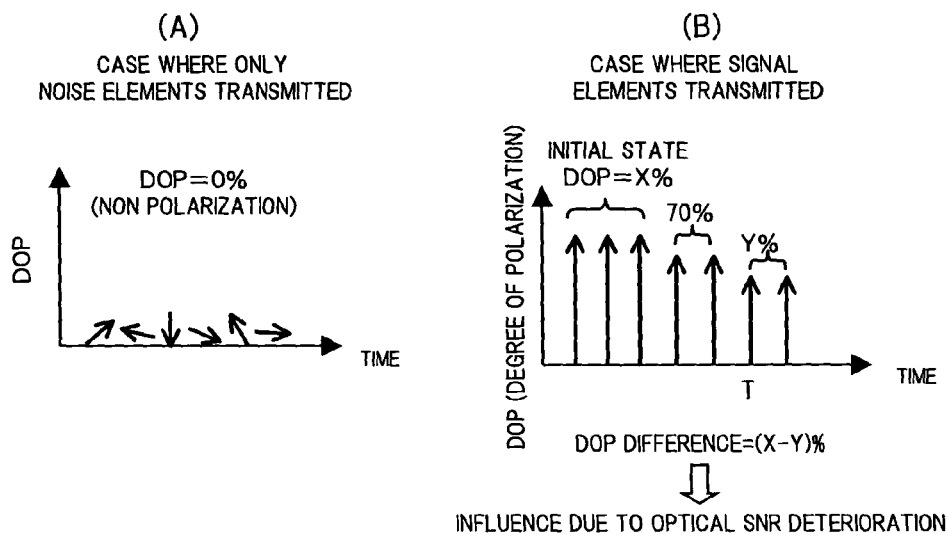
FIG. 4 is an explanatory diagram schematically showing deterioration of the degree of polarization with time in a typical optical transmission system, in which (A) shows the case where only noise components are transmitted, and (B) shows the case where transmitted light contains signal components.
FIG. 5 is an explanatory diagram schematically showing deterioration of the degree of polarization with time in a typical optical transmission system, in which (A) shows the case where PMD compensation is not performed, and (B) shows the case where PMD compensation is performed.

FIG. 4 is an explanatory diagram schematically showing a change in the degree of polarization with time, wherein (A) shows the case where a transmitted light has no signal component, and only noise components, such as ASE light and the like generated when an optical amplifier is disposed on the transmission path, are transmitted, and (B) shows the case where the transmitted light contains signal components. The arrow directions in the figure correspond to polarization directions of the transmitted light.

As shown in (A) of FIG. 4, in the case where only the noise components are transmitted, since the transmitted light is not polarized, the degree of polarization is 0%. Conversely, as shown in (B) FIG. 4, in the case where the optical signal with uniform polarization is transmitted, the degree of polarization of the optical signal after transmission is influenced by the change in the optical SNR with the lapse of time, to be deteriorated. Here, if the degree of polarization of the transmitted light when it is introduced to the system is X % as an initial state, and the degree of polarization after a certain time T has elapsed is deteriorated to Y % (X>Y), then the deterioration from the initial state (X-Y) % corresponds to the change in the optical SNR, thus enabling the optical SNR at time T to be determined based on (X-Y) %. It is known that wavelength dispersion of the transmitted light does not affect the degree of polarization.

Furthermore, the relationship between the degree of polarization and the optical SNR in the case of considering an influence of polarization mode dispersion (PMD) is shown in FIG. 5 for example. That is, the degree of polarization of the transmitted light that was X % in its initial state, similarly to the above case, is influenced by the change in the optical SNR and the change in the polarization mode dispersion with time, in the case where the polarization mode dispersion is not compensated, and is deteriorated as shown in (A) of FIG. 5. Conversely, in the case where the polarization mode dispersion is compensated, since a compensation amount of polarization mode dispersion is feedback controlled such that the degree of polarization always reaches a maximum when the system is operating, the deterioration of the degree of polarization with time as shown in (B) of FIG. 5 occurs only from the influence of the change in the optical SNR. Accordingly, if the degree of polarization of the transmitted light is deteriorated from X % at the initial state to Y) % after the certain time T has elapsed, the deterioration (X-Y) % corresponds to an amount of the change in the optical SNR. Hence, it is possible to determine the optical SNR at time T based on (X-Y) %.

Based on the above-described relationship between the degree of polarization and the optical SNR, to be specific, in the optical SNR monitoring apparatus 10 of the first embodiment in FIG. 1, a part of the optical signal sent from the optical transmission apparatus 1 and propagated through the optical transmission path 3 is branched by the optical coupler 11 as a monitoring light, the degree of polarization of the monitoring light is measured by the measuring device 12, and a measured result is transmitted to the optical SNR calculation circuit 13. The initial value X % of the degree of polarization of the transmitted light at the time when introduced to the system is previously stored in the optical SNR calculation circuit 13, the deterioration of the degree of polarization (X-Y) % is obtained using the degree of polarization Y % for a time required, measured by the DOP measuring device 12, and the optical SNR of the optical signal after transmission is determined according to the deterioration (X-Y) %.

According to the first embodiment as described above, the optical SNR is monitored based on the degree of polarization of the transmitted light, so that it is possible to monitor the optical SNR of the transmitted light with high accuracy, compared with the conventional case where a spectrum analyzer unit, whose function is limited, is utilized.

Figure 6:
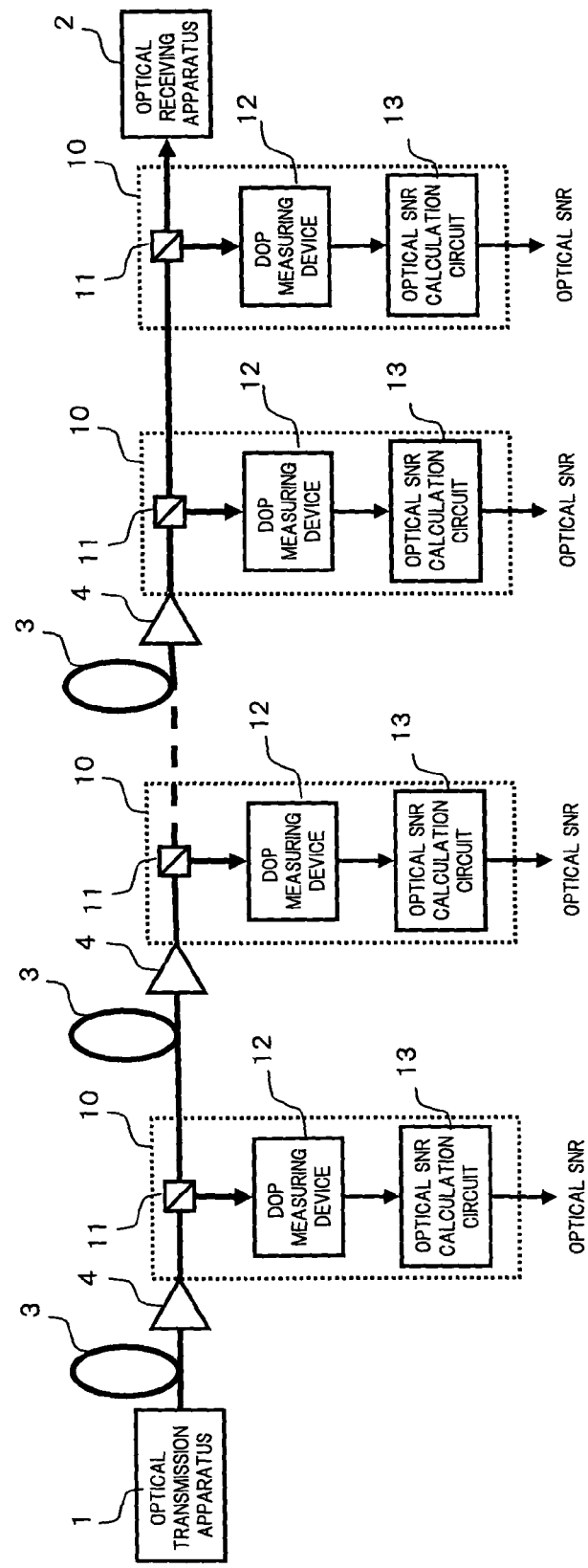
FIG. 6 shows a configuration example of the case where the monitoring method of the present invention is applied to a multi-repeater optical transmission system in conjunction with the first embodiment described above.

In the first embodiment, an example is shown in which the optical SNR monitoring method according to the present invention is used for a non-repeater optical transmission system, wherein no optical repeater or the like is arranged on the optical transmission path 3. However, as shown in FIG. 6 for example, it is also possible to use the monitoring method of the present invention for a multi-repeater optical transmission system, in which optical repeaters 4 are arranged on the optical transmission path at a required space. In this case, it is possible to provide the optical SNR monitoring device 10 in plural number corresponding to each repeating interval, and it is possible to monitor the optical SNR of the optical signal transmitted through each repeating interval, or the optical SNR of the optical signal transmitted through all the repeating intervals.

Next is a description of a second embodiment of the optical transmission system to which the optical SNR monitoring method of the present invention is applied.

Figure 7:
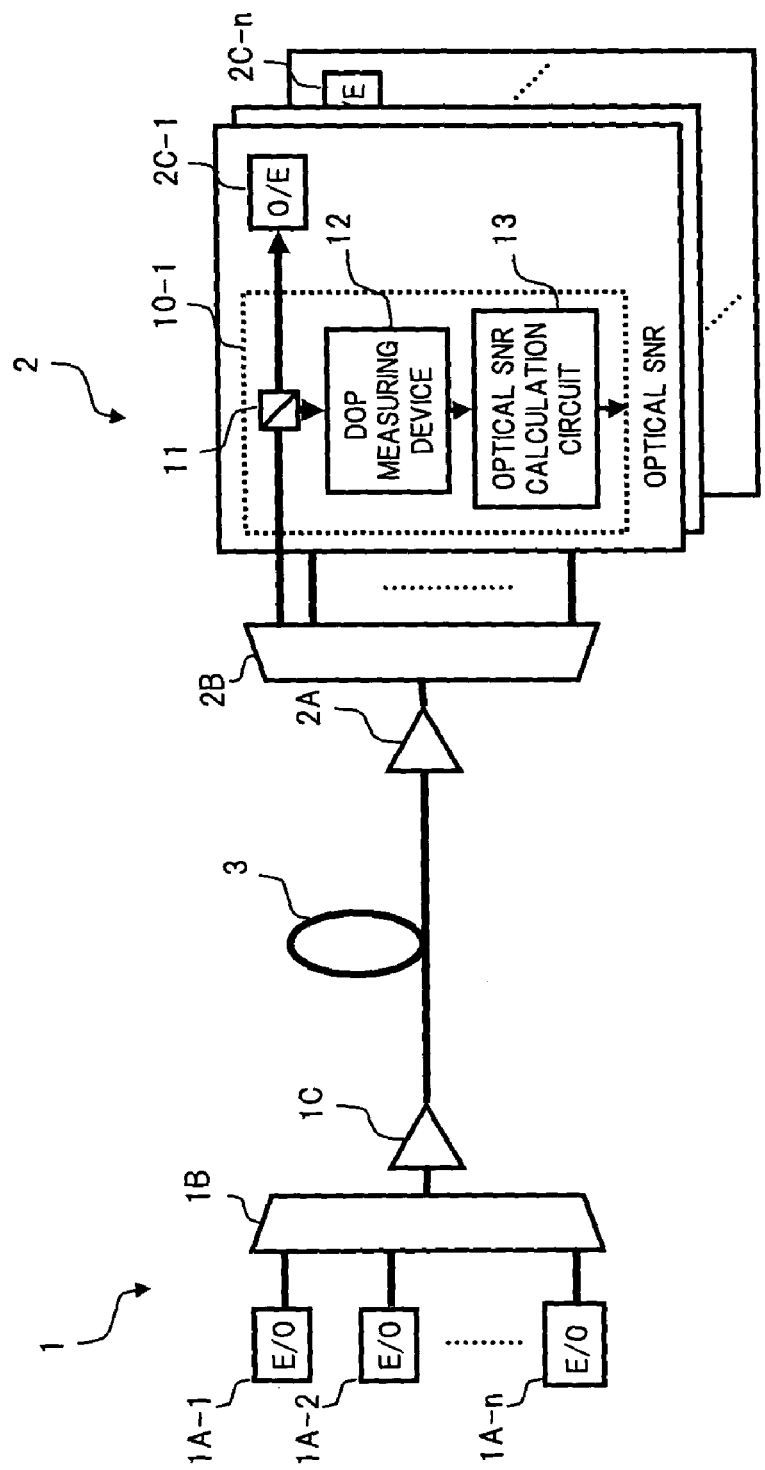
FIG. 7 is a block diagram showing a second embodiment of the optical transmission system to which the optical SNR monitoring method of the present invention is applied.

FIG. 7 is a block diagram showing the optical transmission system of the second embodiment. The same numerical references are denoted for the parts of the same configuration as in the optical transmission system of the first embodiment, and description thereof is omitted. The same rule is applied hereunder to the other figures.

The configuration shown in FIG. 7 shows an example in which the optical SNR monitoring method of the present invention is applied to a WDM optical transmission system wherein a WDM light obtained by wavelength multiplexing a plurality of optical signals with different wavelengths (here, optical signals with n wavelengths) is transmitted from the optical transmission apparatus 1 to the optical receiving apparatus 2 via the optical transmission path 3.

To be specific, the optical transmission apparatus 1 includes, for example, transmitters (E/O) 1A-1, 1A-2, . . . 1A-n, which generate optical signals of n different wavelengths, a multiplexer 1B multiplexing the optical signals of respective wavelengths generated in the transmitters 1A-1 to 1A-n, and an optical amplifier 1C amplifying the WDM light output from the multiplexer 1B to a required level, to transmit it to the optical transmission path 3.

Furthermore, the optical receiving apparatus 2 includes an optical amplifier 2A amplifying the WDM light transmitted through the optical transmission path 3 to a required level, a demultiplexer 2B demultiplexing the WDM light output from the optical amplifier 2A according to wavelength, and receivers (O/E) 2C-1 to 2C-n receiving optical signals of respective wavelengths demultiplexed by the demultiplexer 2B, wherein optical SNR monitoring apparatuses 10-1 to 10-n monitoring the optical SNR of each of the optical signals received by the receivers 2C-1 to 2C-n are inserted between the demultiplexer 2B and each of the receivers 2C-1 to 2C-n. Each of the optical SNR monitoring apparatuses 10-1 to 10-n comprises the optical coupler 11, the DOP measuring device 12 and the optical SNR calculation circuit 13 similarly to the case of the first embodiment as described above.

In the optical transmission system with such a configuration as described above, each of the optical SNRs of the optical signals corresponding to respective wavelengths of the WDM light after propagated through the optical transmission path 3 is monitored by each of the optical SNR monitoring apparatuses 10-1 to 10-n. As a result, it is also possible to monitor with high accuracy, the optical SNRs of the optical signals of respective wavelengths in the WDM optical transmission system, similarly to the case of the first embodiment.

Next is a description of a third embodiment of the optical transmission system to which the optical SNR monitoring method of the present invention is applied.

Figure 8:
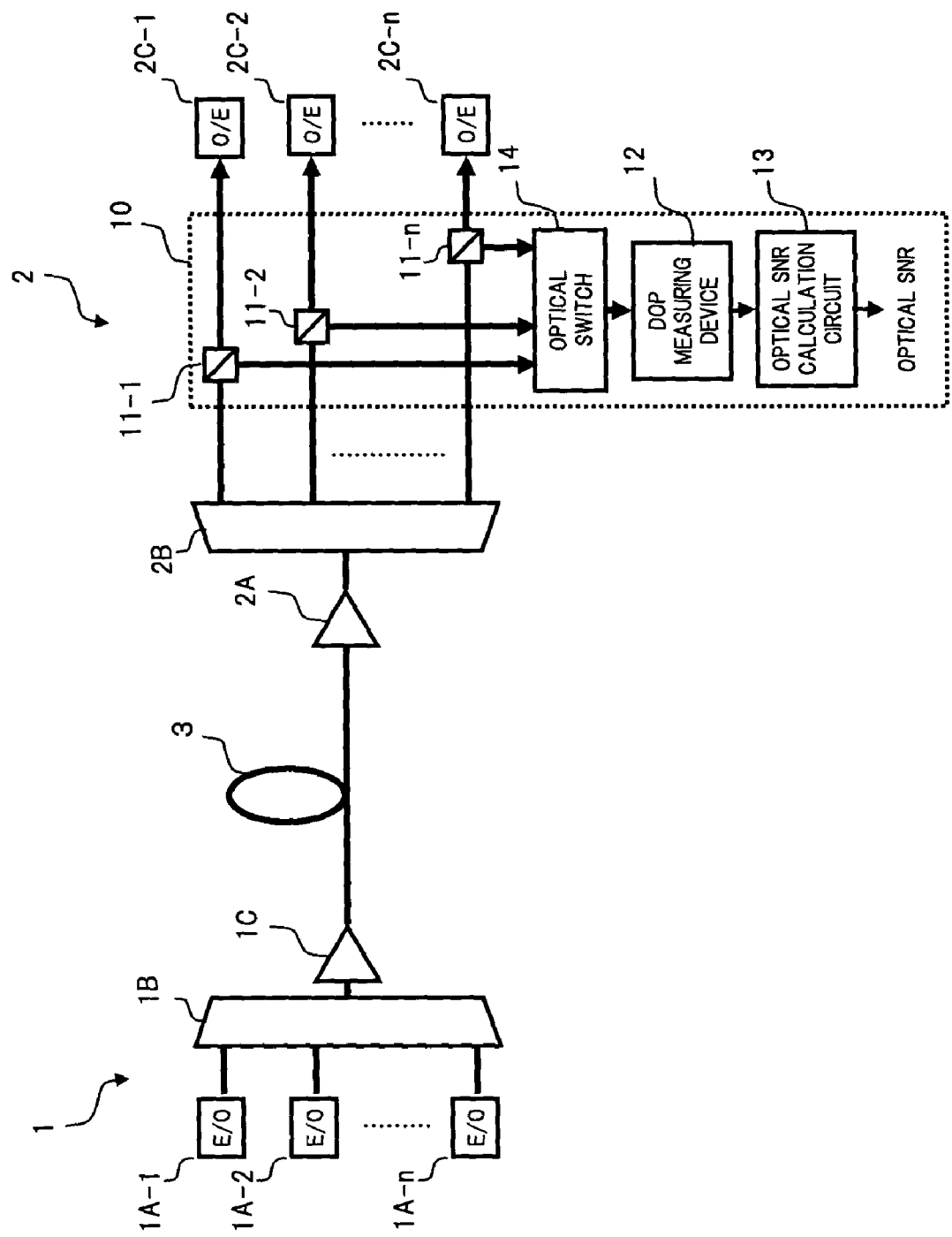
FIG. 8 is a block diagram showing a third embodiment of the optical transmission system to which the optical SNR monitoring method of the present invention is applied.

FIG. 8 is a block diagram showing the optical transmission system of the third embodiment.

In FIG. 8, a difference in the configuration of the present optical transmission system from that of the second embodiment shown in FIG. 7 is that, instead of providing the optical SNR monitoring apparatuses 10-1 to 10-n corresponding to the receivers 2C-1 to 2C-n of the optical receiving apparatus 2, an optical SNR monitoring apparatus 10 is provided, in which a DOP measuring device 12 and an optical SNR calculation circuit 13 are shared between the respective wavelengths.

To be specific, the optical SNR monitoring apparatus 10 of the present embodiment comprises optical couplers 11-1 to 11-n branching a part of the optical signal of each wavelength sent from the demultiplexer 2B of the optical receiving apparatus 2 as each monitoring light, an optical switch 14 selecting any one of the monitoring lights branched by the optical couplers 11-1 to 11-n to output a selected monitoring light, the DOP measuring device 12 measuring the degree of polarization of the monitoring light output from the optical switch 14, and the optical SNR calculation circuit 13 determining the optical SNR of the optical signal based on the result of the measurement by the DOP measuring device 12.

In the optical SNR monitoring apparatus 10 as described above, the optical SNRs of optical signals transmitted to the optical receivers 2C-1 to 2C-n are monitored alternatively, and the optical signals are appropriately switched over to be an object of optical SNR monitoring by the switching operation of the optical switch 14. As a result, it is possible to monitor the optical SNRs of the optical signals of n wavelengths using a set of the optical switch 14, the DOP measuring device 12, and the optical SNR calculation circuit 13, thereby enabling to simplify the configuration of the apparatus.

Figure 9:
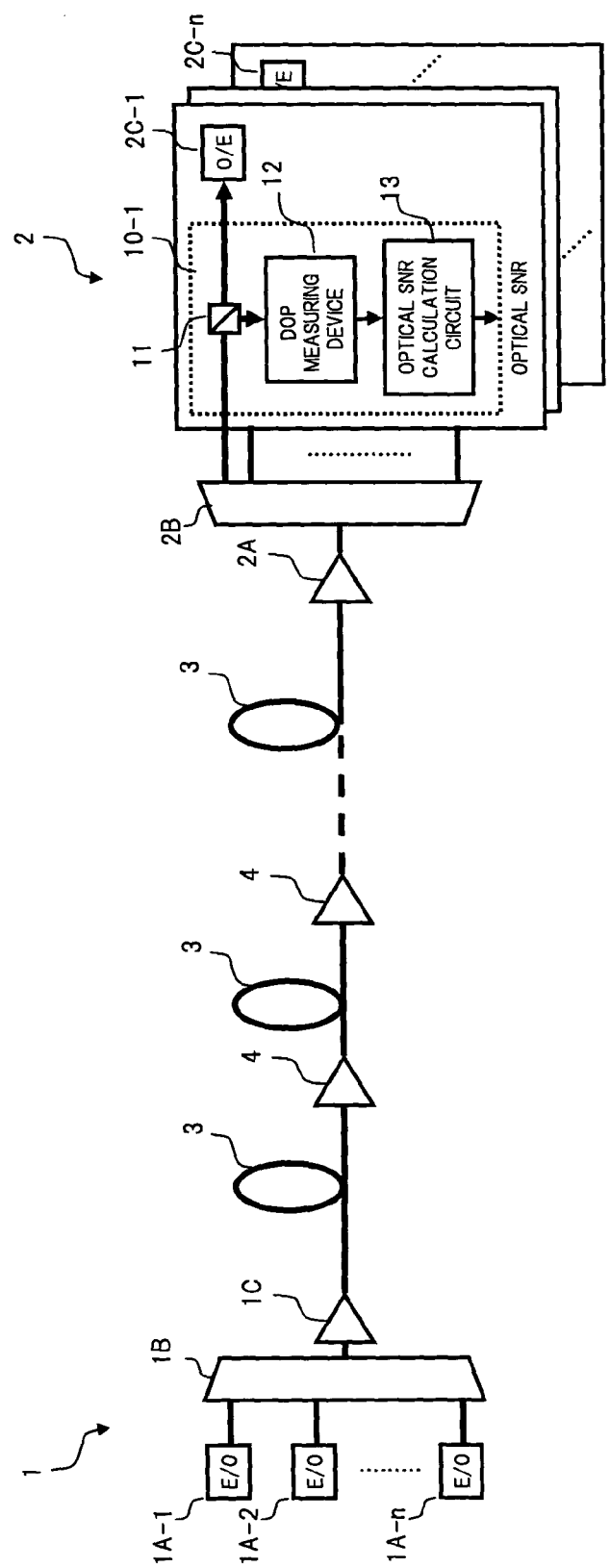
FIG. 9 shows a configuration example of the case where the monitoring method of the present invention is applied to the multi-repeater WDM optical transmission system in conjunction with the third embodiment.
Figure 10:
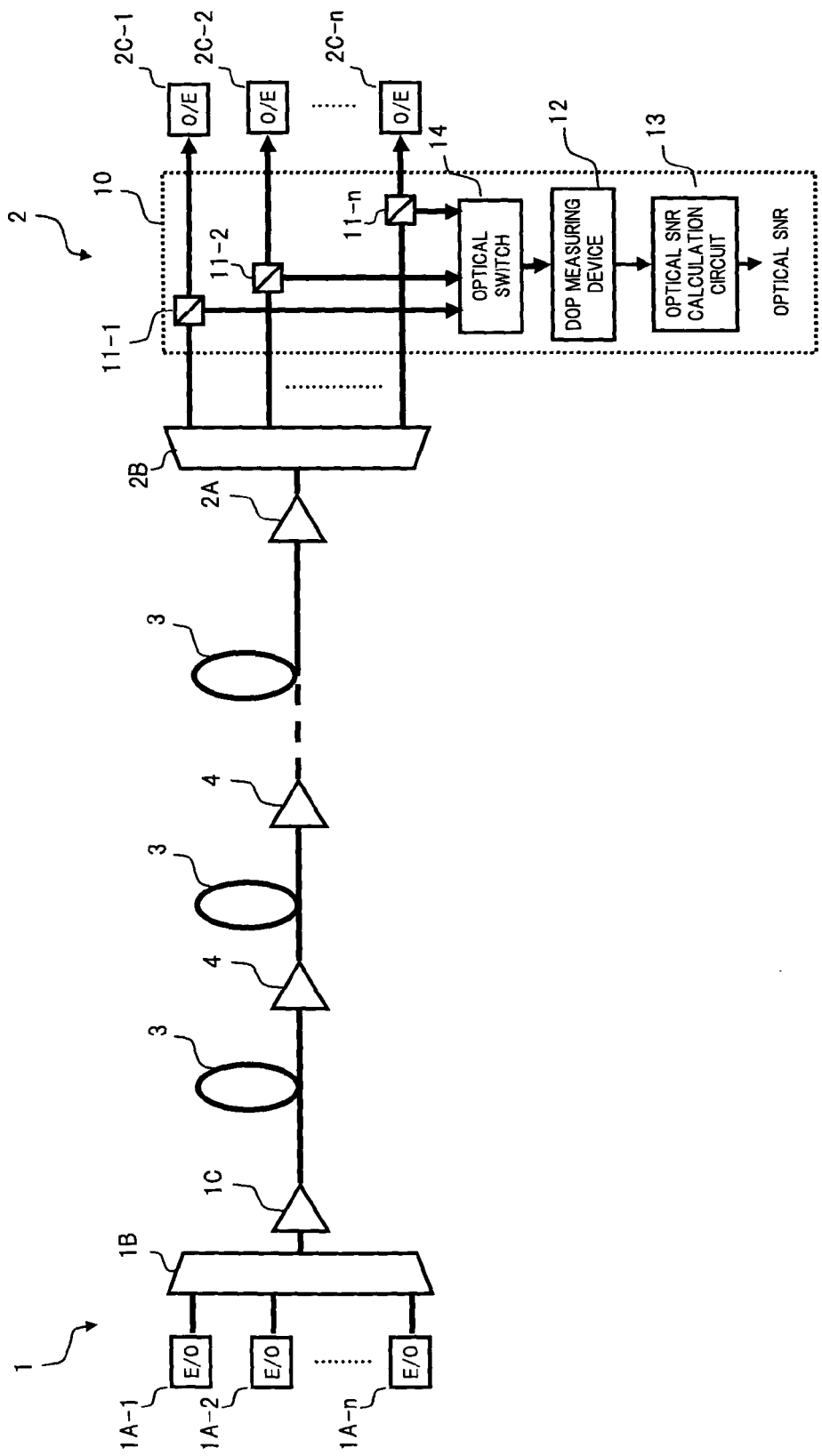
FIG. 10 shows another configuration example of the case where the monitoring method of the present invention is applied to the multi-repeater WDM optical transmission system in conjunction with the third embodiment.

In the previously described second embodiment and the third embodiment, examples are described in which the monitoring method of the present invention is applied to a non-repeater WDM optical transmission system. However, as shown in FIG. 9 and FIG. 10 for example, it is also possible to apply the monitoring method of the present invention to a multi-repeater WDM optical transmission system, in which optical repeaters 4 are arranged on the optical transmission path 3 at a required space similarly to the second embodiment and the third embodiment.

Figure 11:
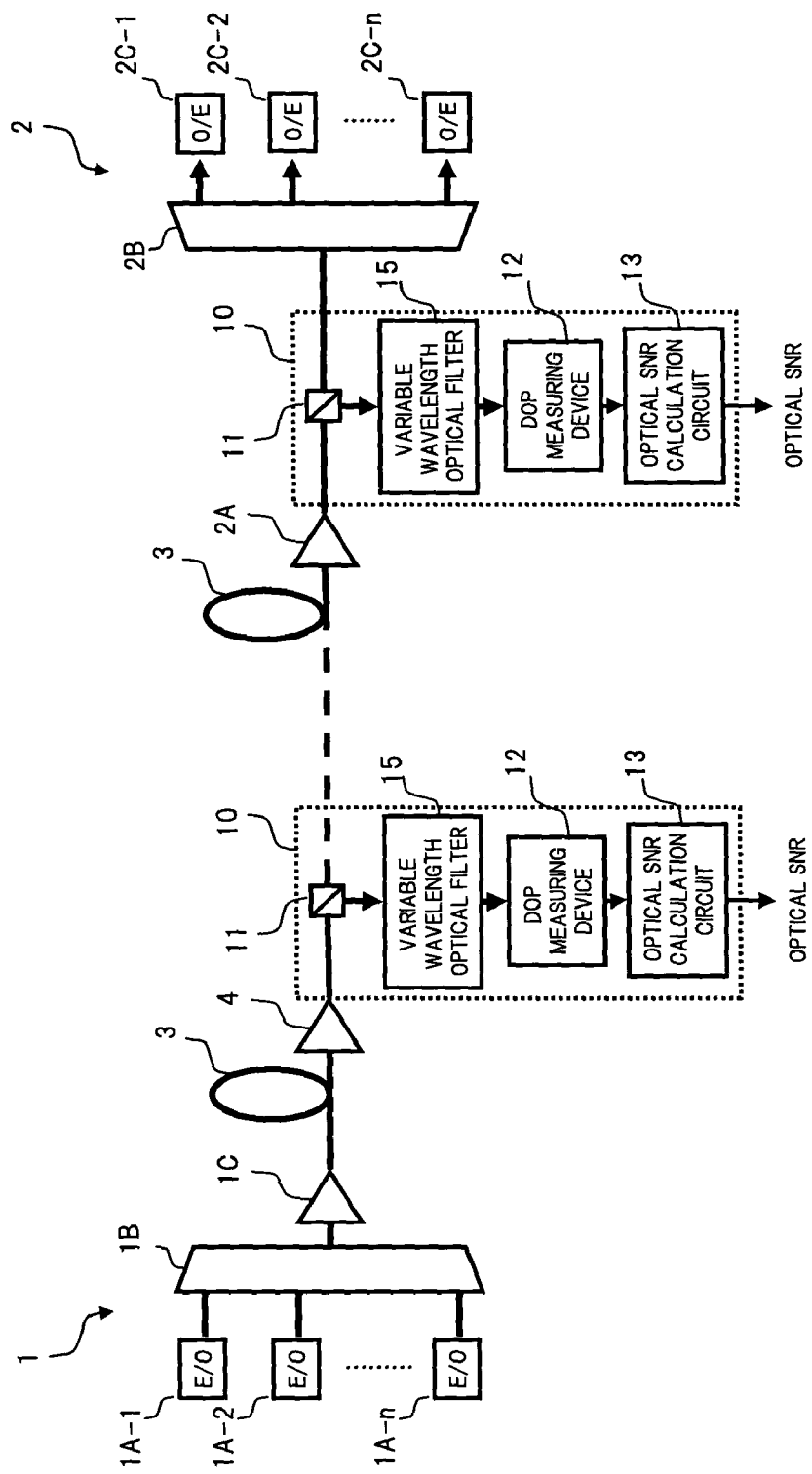
FIG. 11 shows a configuration example of the case where the optical SNR is monitored at each repeating interval in conjunction with the third embodiment.

Furthermore, it is also possible to monitor the optical SNR at each repeating interval in a multi-repeater WDM optical transmission system. To be specific, as shown in FIG. 11 for example, an arrangement may be such that an optical SNR monitoring apparatus, in which a variable wavelength optical filter 15 is inserted between the optical coupler 11 and the DOP measuring device 12, is provided corresponding to each repeating interval, and the optical SNR of the optical signal with a desired wavelength is monitored by changing a transmission wavelength of the variable wavelength optical filter 15. In the configuration example of FIG. 11, also in the optical receiving apparatus 2, the optical SNR monitoring apparatus 10 using the variable wavelength optical filter 15 is provided between the optical amplifier 2A and the demultiplexer 2B. However, it is also possible to use an optical receiving apparatus with a configuration as shown in FIG. 7 or FIG. 8 described above.

Next is a description of a fourth embodiment of the optical transmission system to which the optical SNR monitoring method of the present invention is applied.

Figure 12:
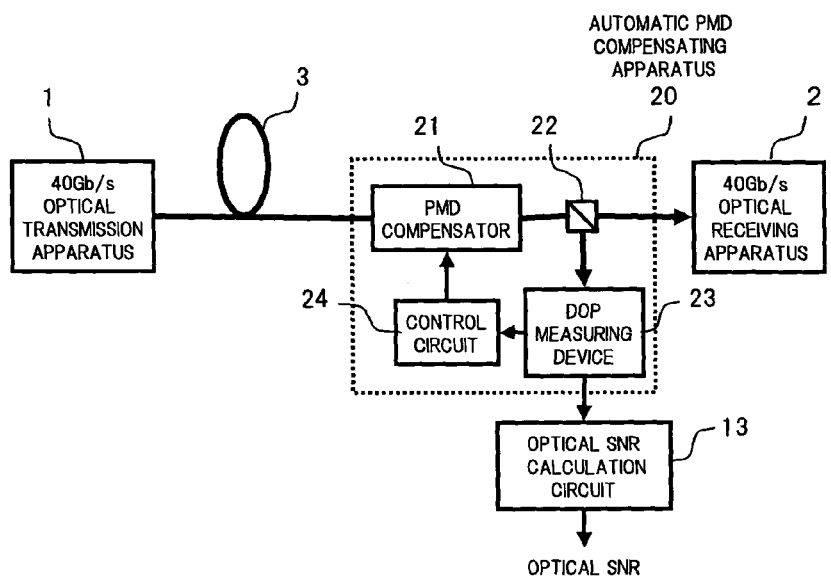
FIG. 12 is a block diagram showing a fourth embodiment of the optical transmission system to which the optical SNR monitoring method of the present invention is applied.

FIG. 12 is a block diagram showing the optical transmission system of the fourth embodiment.

In FIG. 12, the optical transmission system of the present embodiment is one where the optical SNR monitoring method of the present invention is applied to a system in which for example, an optical signal with one wavelength at 40 Gb/s bit rate is transmitted without repeating from the optical transmission apparatus 1 to the optical receiving apparatus 2 via the optical transmission path 3, and also PMD generated in the transmitted light is compensated dynamically by an automatic PMD compensation apparatus 20 provided at a receiving end.

To be specific, for example, the above-described automatic PMD compensation apparatus 20 includes a PMD compensator 21, an optical coupler 22, a DOP measuring device 23 and a control circuit 24. The PMD compensator 21 is a known optical device with a variable delay amount that feeds a delay of opposite sign to the PMD generated in the optical transmission path 3, to an optical signal input thereto. The optical signal passed through the PMD compensator 21 is sent to the optical receiving apparatus 2 via the optical coupler 22, and also a part thereof is branched by the optical coupler 22 as a monitoring light to be sent to the DOP measuring device 23. The DOP measuring device 23 measures the degree of polarization of the monitoring light from the optical coupler 22. This DOP measuring device 23 is the same as the DOP measuring device 12 used for the optical SNR monitoring apparatus 10 in the first to the third embodiments. The control circuit 24 feedback controls a delay amount of the PMD compensator 21 so that the degree of polarization measured by the DOP measuring device 23 reaches a maximum.

In a 40 Gb/s optical transmission system in which the automatic PMD compensation apparatus 20 as described above is provided at the receiving end, it is possible to monitor the optical SNR of the transmitted light based on the degree of polarization by simply installing a similar optical SNR calculation circuit 13 to the cases of the first to the third embodiments, to feed the degree of polarization measured by the DOP measuring device 23 to the optical SNR calculation circuit 13 for dynamic PMD compensation. As a result, there is no need to install separately a unit for monitoring the optical SNR, such as a spectrum analyzer unit or the like, and a unit for monitoring polarization, thus enabling the configuration of the 40 Gb/s optical transmission system to be simplified and the cost to be reduced.

In the fourth embodiment, a system is described in which the bit rate of transmitted light is 40 Gb/s. However, the present invention is not limited thereto, and the monitoring method of the present invention is effective for an optical transmission system of any arbitrary transmission speed requiring that the degree of polarization of the transmitted light is measured to compensate PMD dynamically.

Furthermore, the fourth embodiment shows an example of a non-repeater optical transmission system to which the monitoring method of the present invention is applied. However, it is also possible to apply the monitoring method of the present invention similarly to a multi-repeater optical transmission system in which optical repeaters 4 are arranged on the optical transmission path 3 at a required interval as shown in FIG. 13.

Figure 14:
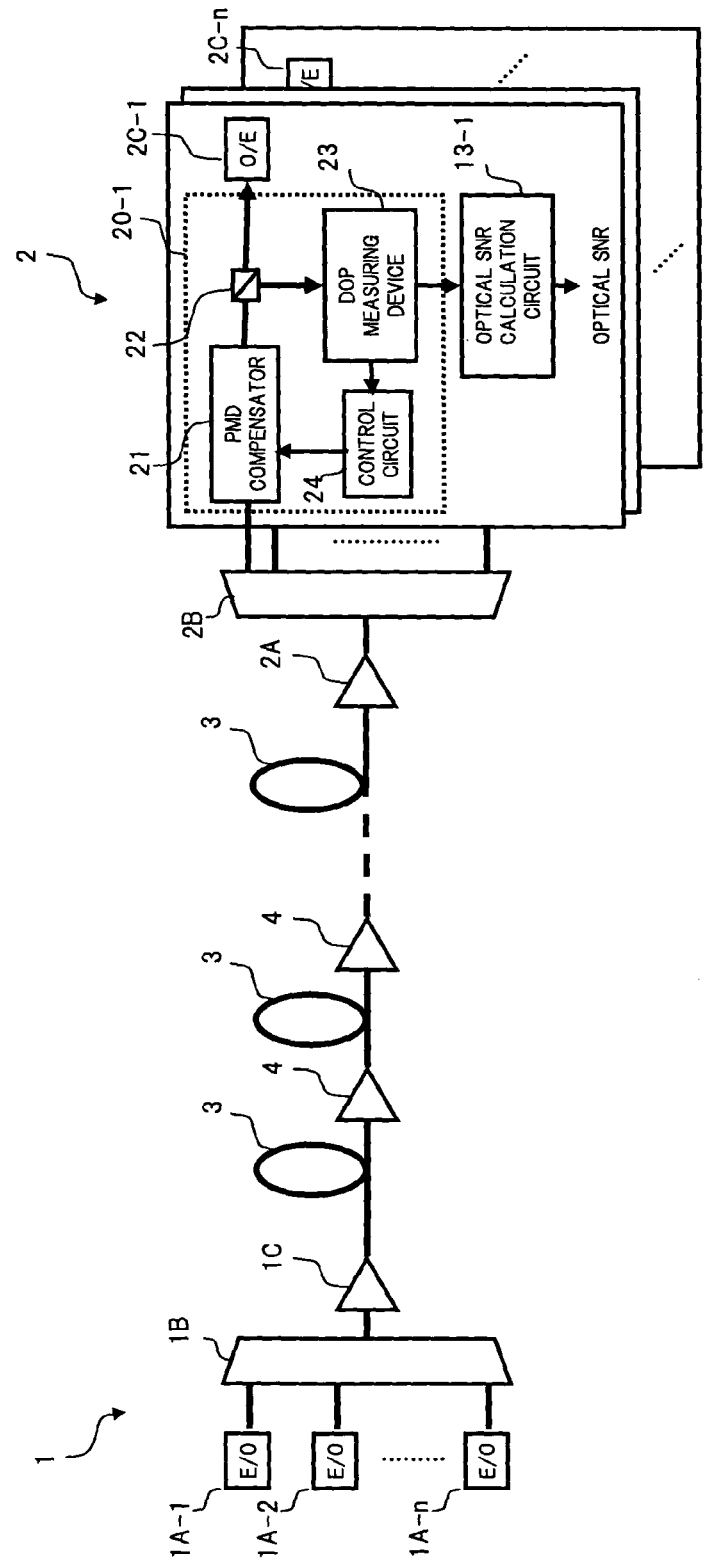
FIG. 14 shows a configuration example of the case where the monitoring method of the present invention is applied to a WDM optical transmission system in conjunction with the fourth embodiment.
Figure 15:
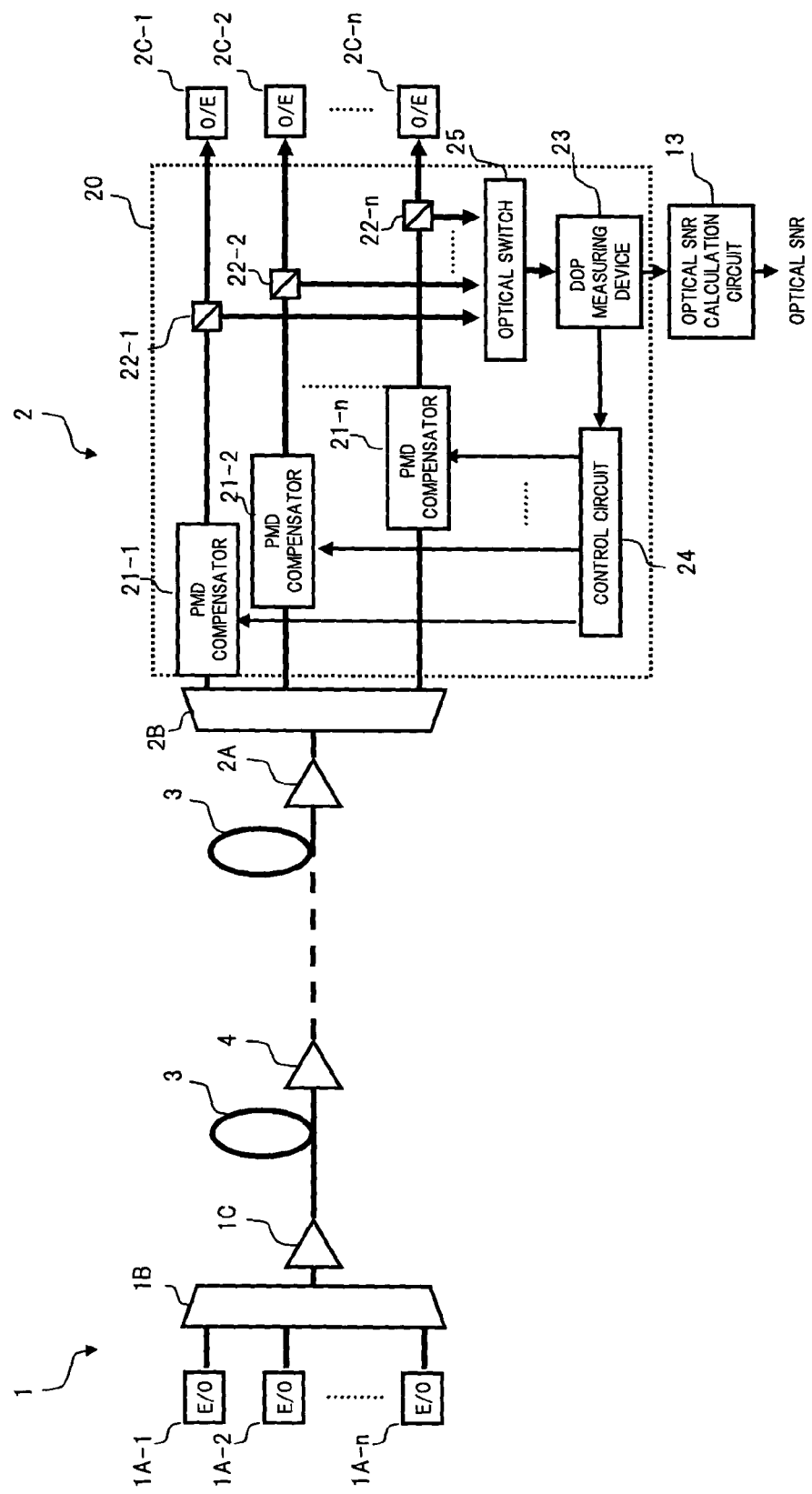
FIG. 15 is another configuration example of the case where the monitoring method of the present invention is applied to the WDM optical transmission system in conjunction with the fourth embodiment.

Moreover, in the fourth embodiment, a system is described in which an optical signal with a single wavelength is transmitted. However, similarly to the second and third embodiments, it is also possible to apply the monitoring method of the present invention to a WDM optical transmission system in which a WDM light obtained by wavelength multiplexing optical signals with n different wavelengths is transmitted. To be specific, as shown in FIG. 14 for example, an arrangement may be such that, in a system in which automatic PMD compensation devices 20-1 to 20-n are installed between the demultiplexer 2B and the receivers 2C-1 to 2C-n, and dynamic PMD compensation is performed for the optical signal of each wavelength, optical SNR calculation circuits 13-1 to 13-n are provided corresponding to the automatic PMD compensation apparatuses 20-1 to 20-n, and the degrees of polarization measured by the DOP measuring devices 23 are fed to the corresponding optical SNR calculation circuits 13. Furthermore, as shown in FIG. 15 for example, in a system in which the degree of polarization corresponding to each wavelength is measured by the shared DOP measuring device 23 using an optical switch 25, and the variable delay amount of each of PMD compensators 21-1 to 21-n is feedback controlled in accordance with the signal output from the common control circuit 24, it is also possible to provide the optical SNR calculation circuit 13 corresponding to the shared DOP measuring device 23.

Figure 13:
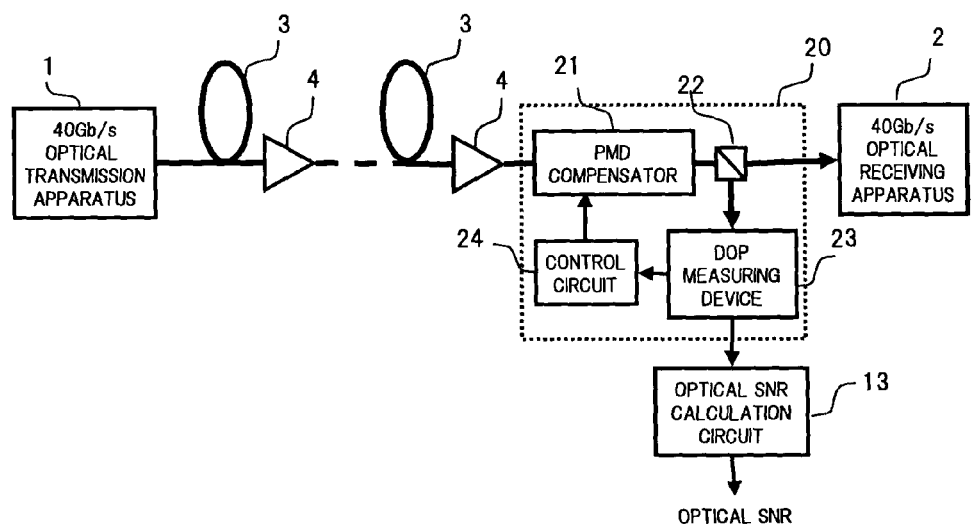
FIG. 13 shows a configuration example of the case where the monitoring method of the present invention is applied to the multi-repeater optical transmission system in conjunction with the fourth embodiment.
Figure 16:
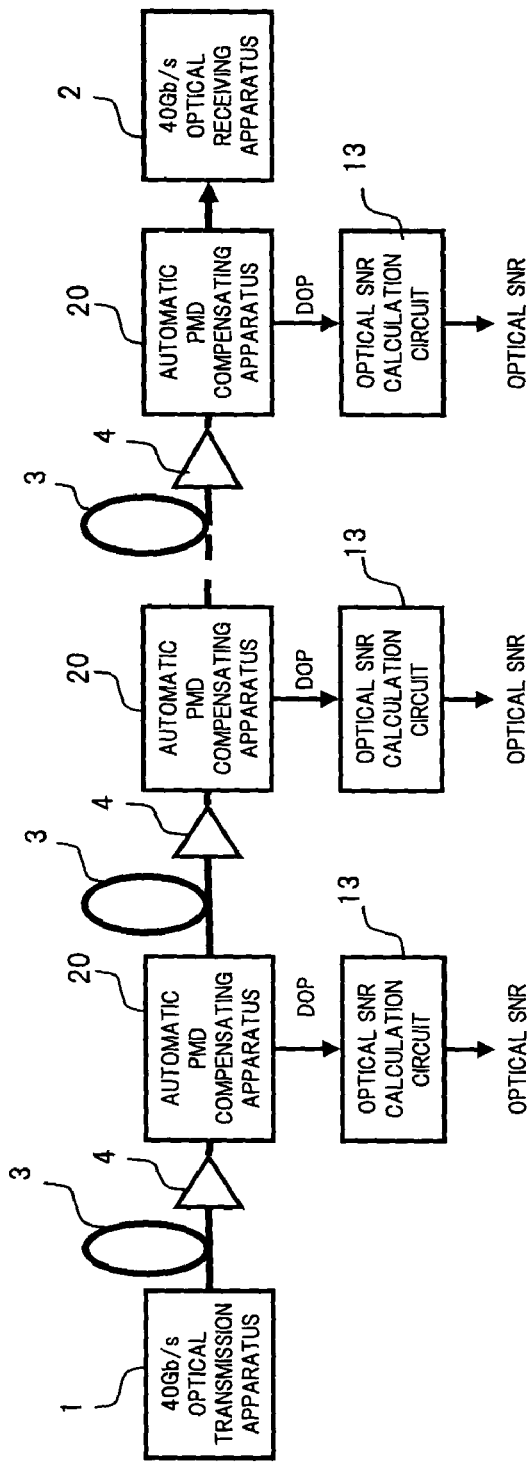
FIG. 16 shows a configuration example of the case where PMD compensation is performed at each repeating interval in the multi-repeater optical transmission system of FIG. 13.
Figure 17:
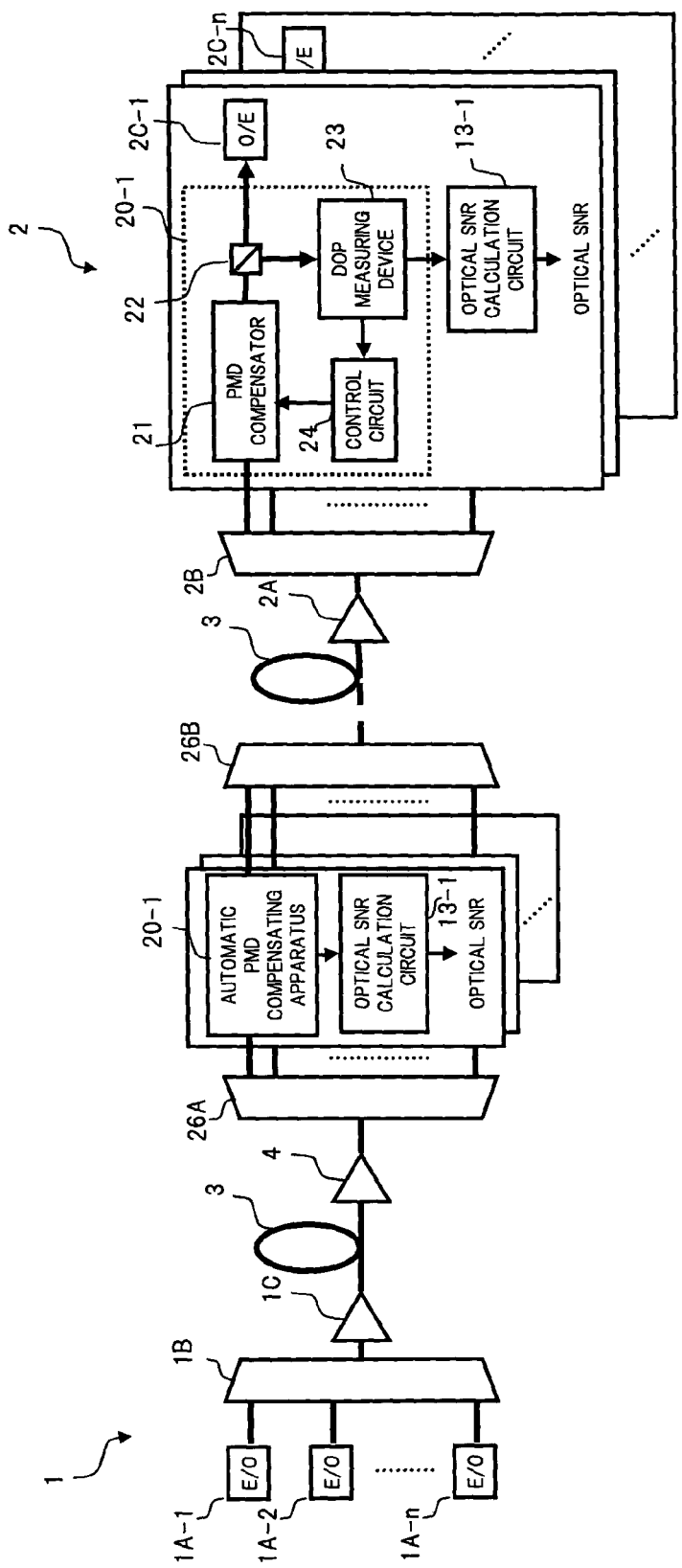
FIG. 17 shows a configuration example of the case where PMD compensation is performed at each repeating interval in the multi-repeater optical transmission system in conjunction with FIG. 16.

In addition, in the case where automatic PMD compensation is performed at each repeating interval in the multi-repeater optical transmission system as shown in FIG. 13 described above, the optical SNR calculation circuit 13 may be provided corresponding to the automatic PMD compensation apparatus installed in each repeating interval to monitor the optical SNR based on the degree of polarization. To be specific, the multi-repeater optical transmission system in which an optical signal of one wavelength is transmitted has a system configuration as shown in FIG. 16 for example. Furthermore, for the multi-repeater WDM optical transmission system in which the WDM light is transmitted, as shown in FIG. 17 for example, in a configuration in which the WDM light is demultiplexed for each wavelength by a demultiplexer 26A at each repeating interval, PMD compensation is performed by each of the automatic PMD compensation apparatuses 20-1 to 20-n corresponding to each wavelength, and the optical signals after compensation are multiplexed by a multiplexer 26B for transmission to the optical transmission path 3, it is possible to monitor the optical SNR for each wavelength based on the degree of polarization by providing the optical SNR calculation circuits 13-1 to 13-n corresponding to the automatic PMD compensation apparatuses 20-1 to 20-n.

Here is a description of a preferred application example of the optical SNR monitoring method based on the degree of polarization in the first to the fourth embodiments.

Figure 18:
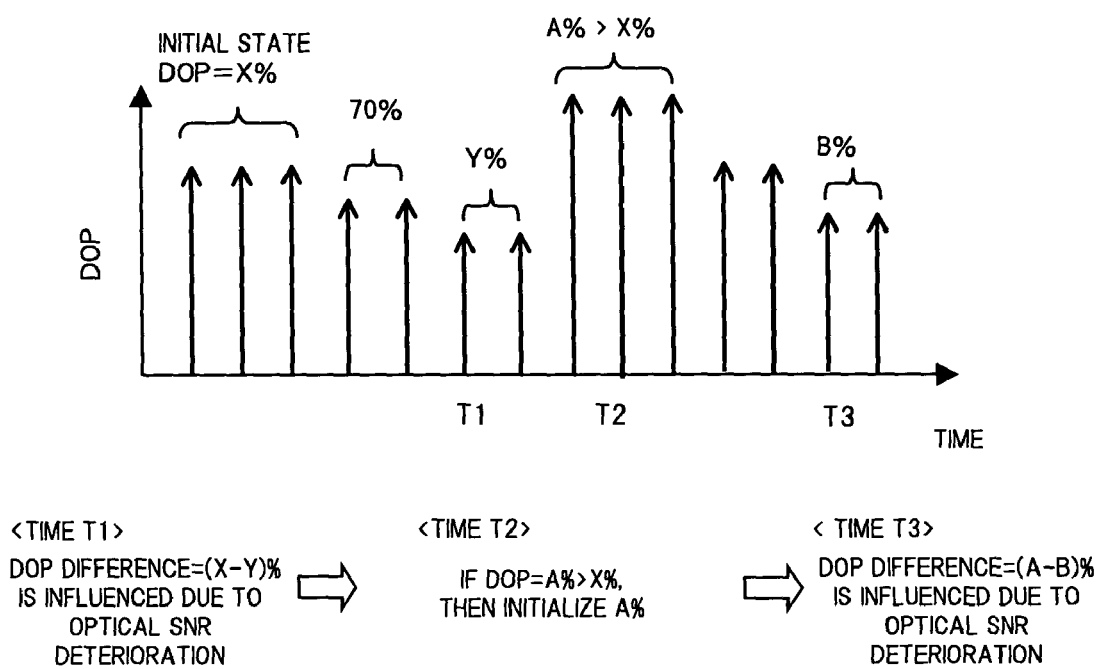
FIG. 18 is a diagram for explaining a preferred application example of the optical SNR monitoring method based on the degree of polarization in each of the above-described embodiments.

As shown in (B) of FIG. 4 and FIG. 5, the degree of polarization of the optical signal propagated through the optical transmission path 3 is basically deteriorated with time from its initial value when it is introduced to the system. However, a situation can be envisaged, for example, in which the degree of polarization of the transmitted light exceeds the initial value, due to a change in the devices comprising the optical transmission system, the operating conditions of the system, or the like. To be specific, as shown in FIG. 18 for example, there is a possibility that a situation occurs in which the initial value of the degree of polarization of when introduced to the system is X %, and after the degree of polarization of when time T1 has elapsed is deteriorated to Y % (X>Y), the degree of polarization of when time T2 (T2>T1) has elapsed reaches A % (A>X), which exceeds the initial value of the degree of polarization, and the degree of polarization of when time T3 (T3>T2) has elapsed is deteriorated to B % (A>B). In such a situation, it is desirable to determine the optical SNR in accordance with the following algorithm, for example, based on the degree of polarization measured by the DOP measuring device.

That is to say, firstly, the initial value X % of the degree of polarization of when introduced to the system is stored in the optical SNR calculation circuit 13. Then, the optical SNR is monitored based on the degree of polarization while detecting a maximum value of the degree of polarization measured by the DOP measuring device. At time T1 shown in FIG. 18, a change amount of the optical SNR is determined by obtaining the deterioration of the degree of polarization (X-Y) % using the measured value Y % of the degree of polarization of the transmitted light. At time T2, by detecting that the measured value A % of the degree of polarization exceeds the initial value X %, the measured value A % is again set as the initial value of the degree of polarization, and is used as a reference for subsequent optical SNR monitoring. Then, at time T3, when the measured value of degree of polarization reaches B %, the change amount of optical SNR is determined based on the deterioration (A-B) % from the again set initial value A %. In this manner, by detecting the maximum value of the degree of polarization of the transmitted light, and again setting the initial value of the degree of polarization successively, it is possible to monitor the optical SNR of the transmitted light accurately.

Next is a description of a fifth embodiment of the optical transmission system to which the optical SNR monitoring method of the present invention is applied.

Figure 19:
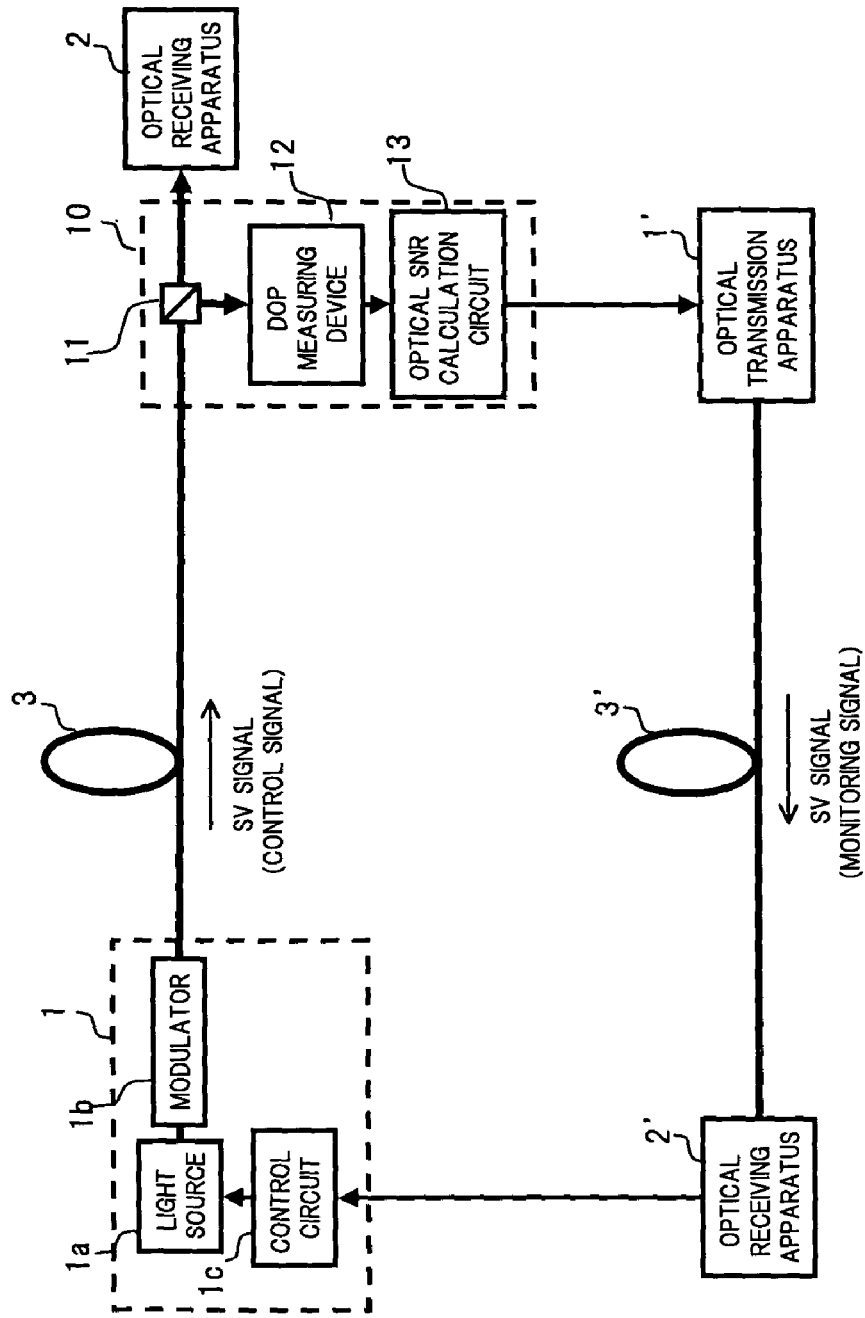
FIG. 19 is a block diagram showing a fifth embodiment of the optical transmission system to which the optical SNR monitoring method of the present invention is applied.

FIG. 19 is a block diagram showing the optical transmission system of the fifth embodiment.

The system configuration shown in FIG. 19 is an example of a non-repeater optical transmission system in which a desired optical SNR of an optical signal received by the optical receiving apparatus 2 can be obtained by feedback controlling the power of the optical signal transmitted from the optical transmission apparatus 1 to the optical transmission path 3 according to the optical SNR of the transmitted light monitored by the optical SNR monitoring apparatus 10 provided at the receiving end. To be specific, here, for the uplink for example, information about the optical SNR of the transmitted light, obtained by the optical SNR monitoring apparatus 10, is transmitted to an optical transmission apparatus 1' on the downlink. The optical transmission apparatus 1' generates a supervisory signal (SV signal) containing information about the optical SNR on the uplink side, and multiplexes the supervisory signal onto a transmitted light on the downlink, to send it to an optical transmission path 3' for transmission to an optical receiving apparatus 2'. The optical receiving apparatus 2' identifies information about the optical SNR on the uplink side based on the received supervisory signal, and transmits the information to the optical transmission apparatus 1 on the uplink side. The optical transmission apparatus 1 controls the power of the optical signal to be sent to the optical transmission path 3 by, for example, adjusting a drive condition of a light source 1a in accordance with a control signal output from a control circuit 1c, according to the optical SNR of the transmitted light fed back via the downlink, so as to obtain the desired optical SNR at the receiving end. A modulator 1b in the optical transmission apparatus 1 is an external modulator modulating a continuous light output from the feedback controlled light source 1a, in accordance with a data signal.

According to the optical transmission system with a configuration as described above, since the power of the transmitted light is controlled by feeding back the optical SNR of the transmitted light monitored by the optical SNR monitoring apparatus 10 at the receiving end to the optical transmission apparatus 1, it becomes possible to ensure a high optical SNR of an optical signal received by the optical receiving apparatus 2 stably.

In the fifth embodiment, an example is shown in which the drive condition of the light source 1a of the optical transmission apparatus 1 is feedback controlled according to the optical SNR obtained by the optical SNR monitoring apparatus 10. However, for example, in a configuration in which the power of the optical signal output from the light source 1a or the modulator 1b is adjusted using a variable optical attenuator, an optical amplifier, or the like, the attenuation of the variable optical attenuator or a gain of the optical amplifier may be feedback controlled.

Figure 20:
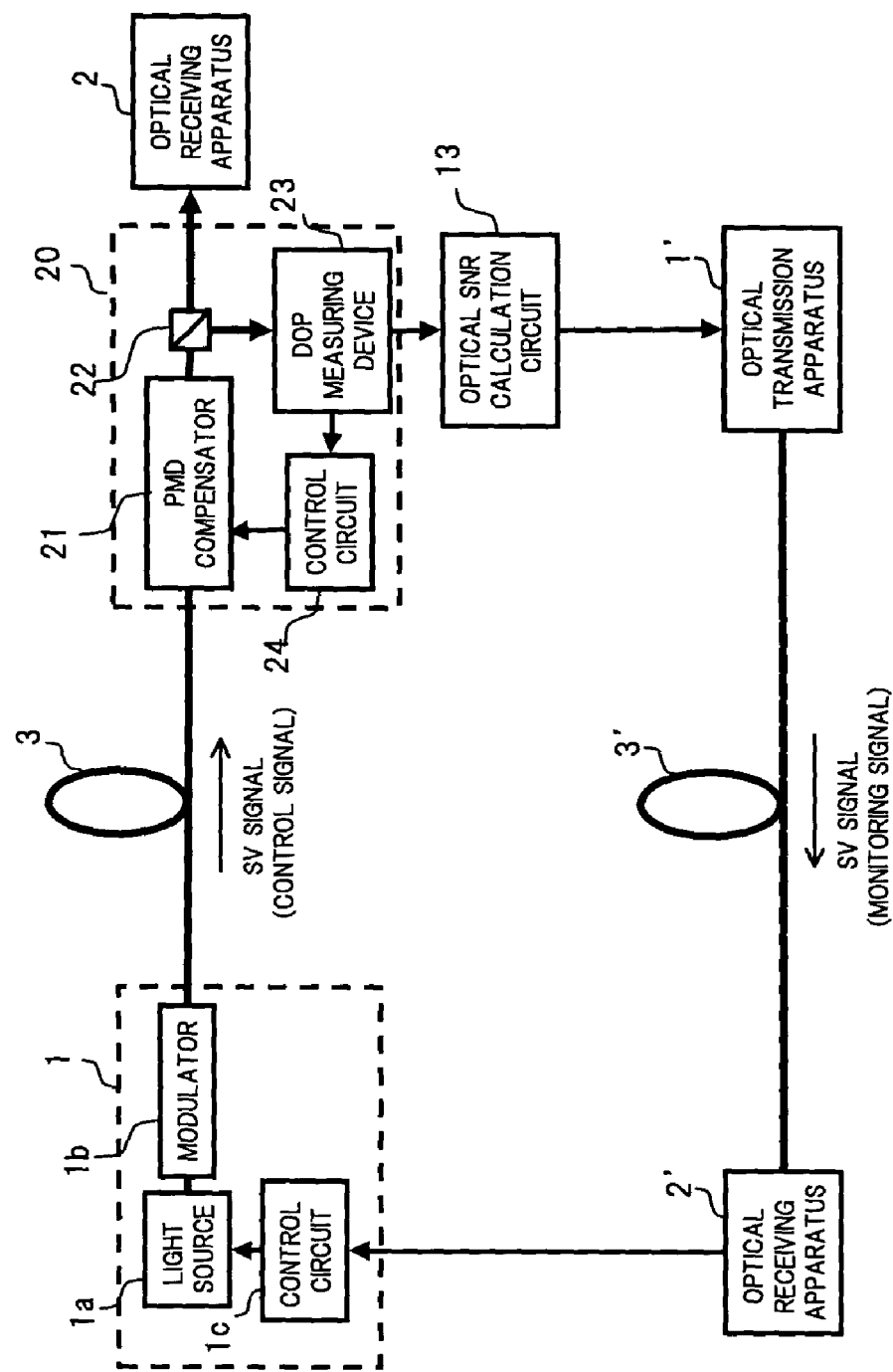
FIG. 20 shows a configuration example of the case where PMD compensation is performed at a receiving end in conjunction with the fifth embodiment.

Furthermore, in the system in which PMD generated in the transmitted light is compensated dynamically as in the case of the fourth embodiment, then as shown in FIG. 20 for example, the optical SNR of the transmitted light calculated by the optical SNR calculation circuit 13, based on the degree of polarization measured by the DOP measuring device 23 of the automatic PMD compensation apparatus 20 installed at the receiving end, may be fed back to the optical transmission apparatus 1 via the downlink. According to such a configuration, it becomes possible to realize an ultra high speed optical transmission system in which a high optical SNR can be ensured stably.

Next is a description of a sixth embodiment of the optical transmission system to which the optical SNR monitoring method of the present invention is applied.

Figure 21:
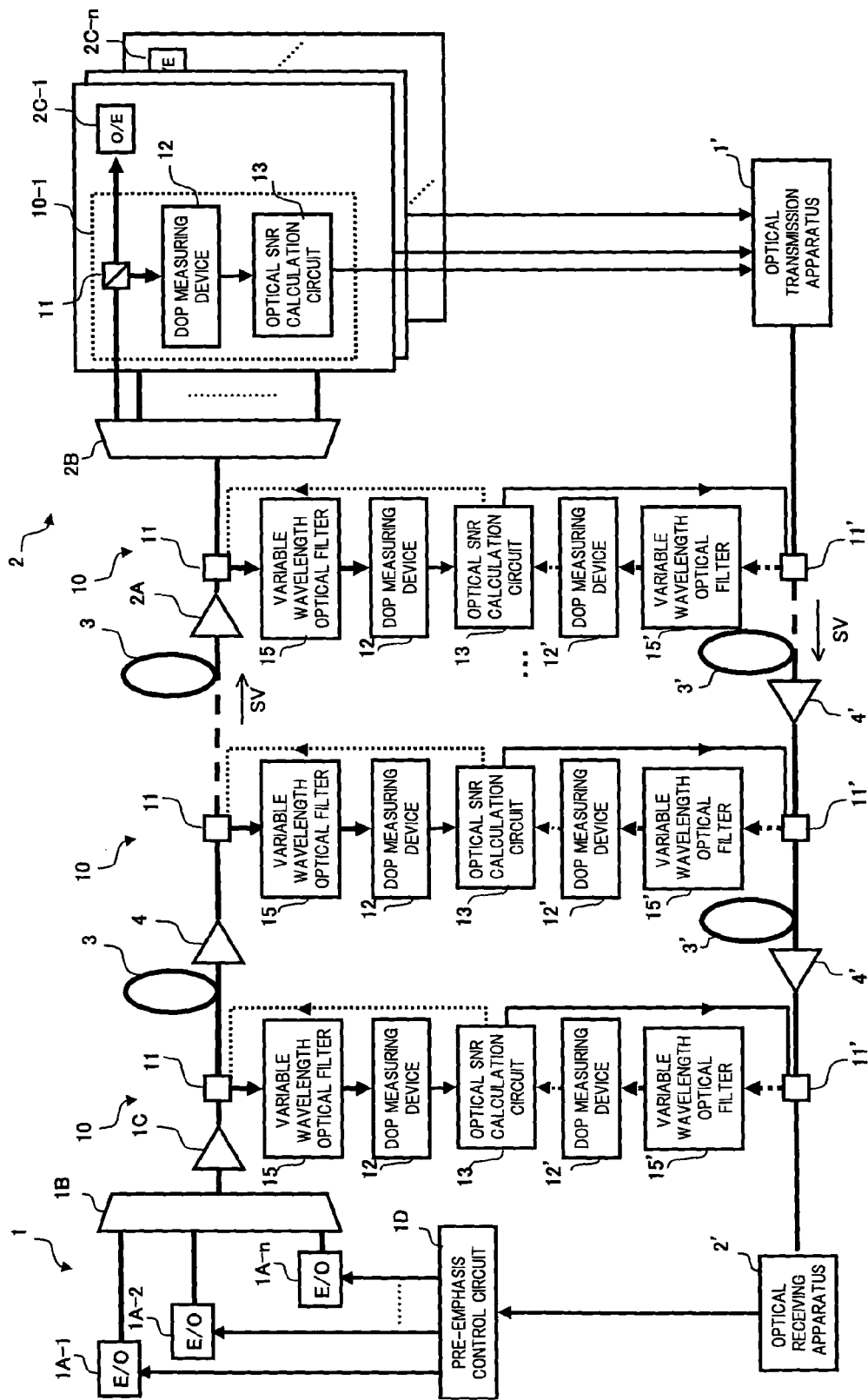
FIG. 21 is a block diagram showing a sixth embodiment of the optical transmission system to which the optical SNR monitoring method of the present invention is applied.

FIG. 21 is a block diagram showing the optical transmission system of the sixth embodiment.

The system configuration shown in FIG. 21 is an example of a multi-repeater WDM optical transmission system in which a WDM light obtained by wavelength multiplexing optical signals of n different wavelengths is transmitted from the optical transmission apparatus 1 to the optical receiving apparatus 2 via the optical transmission path 3 and the optical repeaters 4, where, for example, the optical SNR of the transmitted light is monitored at each of the sending end, the repeating intervals, and the receiving end, and the optical power of each wavelength of the WDM light transmitted from the optical transmission apparatus 1 to the optical transmission path 3 is feedback controlled according to each monitored result, so that a desired optical SNR of the WDM light received by the optical receiving apparatus 2 can be obtained. To be specific, here for example, a variable wavelength optical filter is used in the sending end and the repeating intervals similarly to the configuration as shown in FIG. 11, optical SNR monitoring apparatuses 10, in each of which the optical SNR calculation circuit 13 is shared for the uplink and the downlink, are provided, furthermore the optical SNR monitoring apparatuses 10-1 to 10-n are provided corresponding to respective wavelengths similarly to the configuration as shown in FIG. 7, and the optical SNR of the transmitted light output from the optical SNR calculation circuit 13 of each optical SNR monitoring apparatus is fed back to the optical transmission apparatus 1 via the opposed links. Solid arrows in FIG. 21 correspond to paths when monitored optical SNRs on the uplink are fed back via the downlink, and broken arrows correspond to paths when monitored optical SNRs on the downlink are fed back via the uplink.

Figure 22:
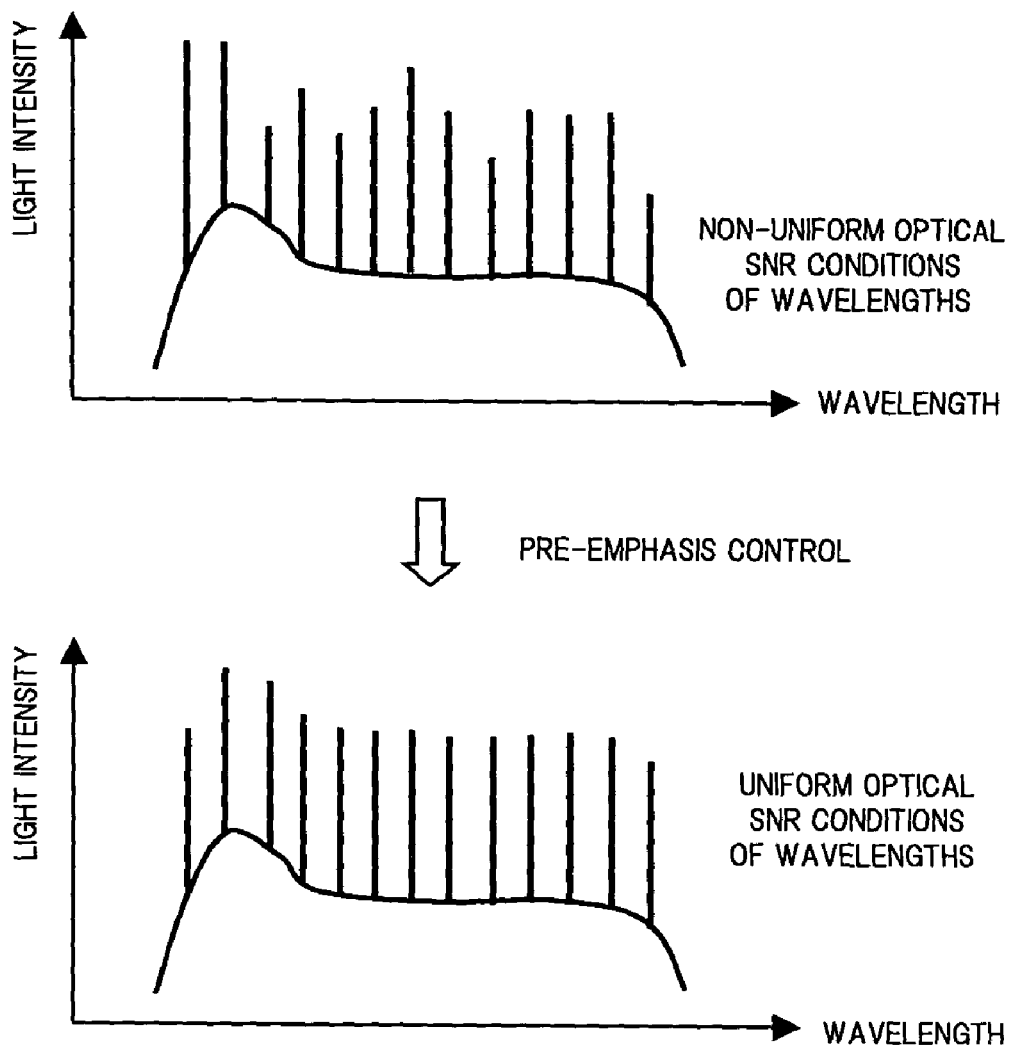
FIG. 22 is a diagram for explaining a pre-emphasis control in the sixth embodiment.

The optical transmission apparatus 1 performs a pre-emphasis control of WDM light to be sent to the optical transmission path 3 by adjusting the drive conditions of the transmitters 1A-1 to 1A-n corresponding to respective wavelengths in accordance with control signals generated in a pre-emphasis control circuit 1D based on the optical SNRs of transmitted lights fed back via the opposed links. This pre-emphasis control is to control the power of the transmitted light so that the optical SNRs of the optical signals of respective wavelengths received by the optical receiving apparatus 2 are uniform. To be specific, as shown at the top of FIG. 22 for example, in the case where the optical SNRs of the optical signals of respective wavelengths after multi-repeater transmission are not uniform, the pre-emphasis control enables to receive the WDM light of the wavelengths as shown at the bottom of FIG. 22 having uniform optical SNRs by providing a deviation to the transmitted light power of each wavelength in advance so as to eliminate a difference in optical SNR between wavelengths.

According to the multi-repeater WDM optical transmission system with the above configuration, monitored results of the optical SNRs corresponding to respective wavelengths of WDM light received by the optical receiving apparatus 2 are fed back to the optical transmission apparatus 1 to perform the pre-emphasis control of the transmitted light power, thus enabling the WDM light to be multi-repeater transmitted stably with a uniform high optical SNR at each wavelength. Furthermore, by feeding back the monitored results of the optical SNRs at each repeating intervals or at the sending end in addition to the receiving end, it is also possible to realize a more accurate pre-emphasis control.

Figure 23:
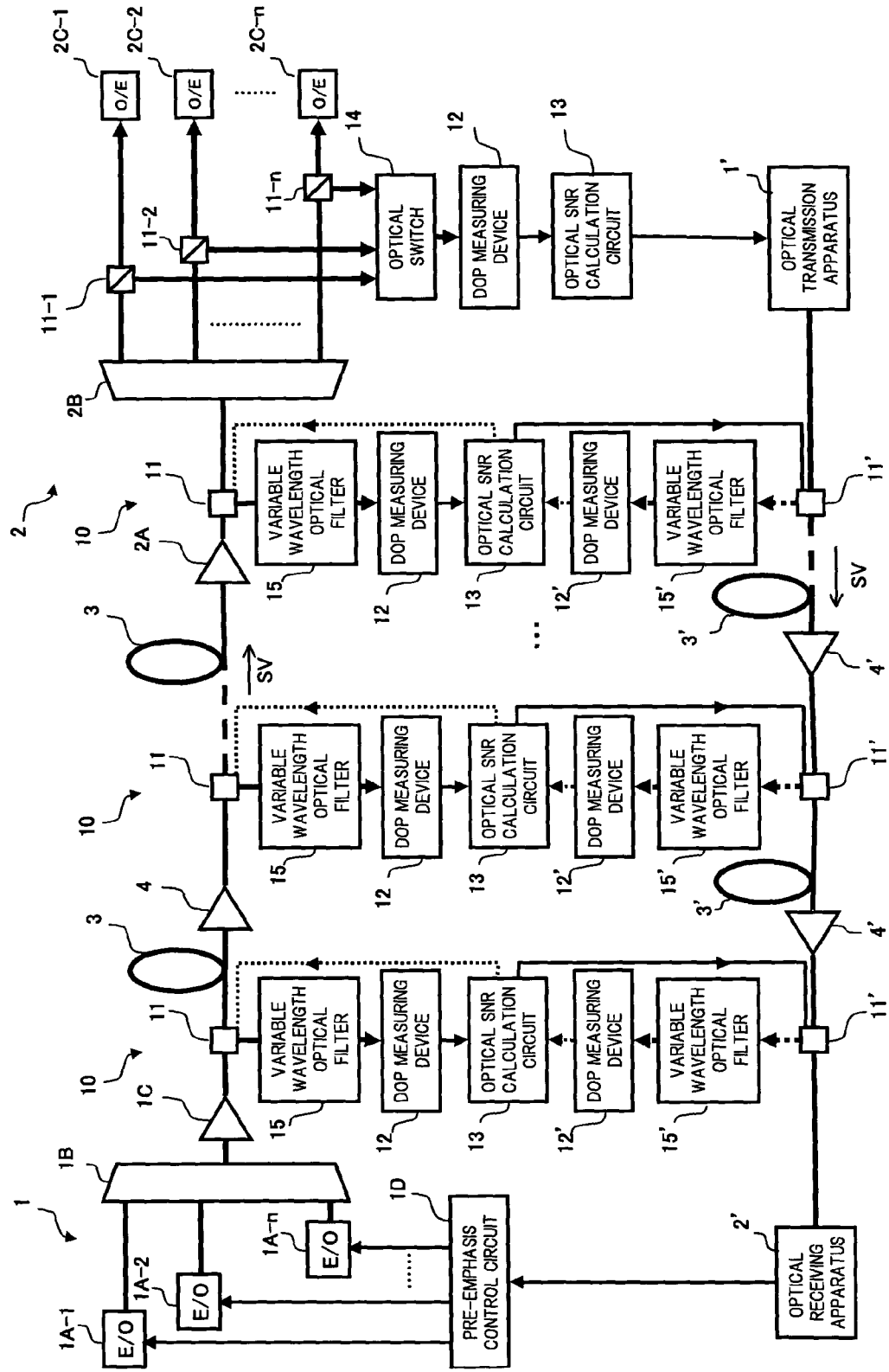
FIG. 23 shows a configuration example of the case where an optical SNR monitoring apparatus utilizing an optical switch is used in conjunction with the sixth embodiment.

In the sixth embodiment, the optical SNR monitoring apparatuses 10-1 to 10-n corresponding to respective wavelengths are provided in the optical receiving apparatus 2. However, similarly to the configuration shown in FIG. 8, an optical SNR monitoring apparatus 10 in which the DOP measuring device 12 and the optical SNR calculation circuit 13 are shared between the wavelengths, may be provided in the optical receiving apparatus 2, by utilizing an optical switch. FIG. 23 shows a configuration example of this case.

Next is a description of a seventh embodiment of the optical transmission system to which the optical SNR monitoring method of the present invention is applied.

Figure 24:
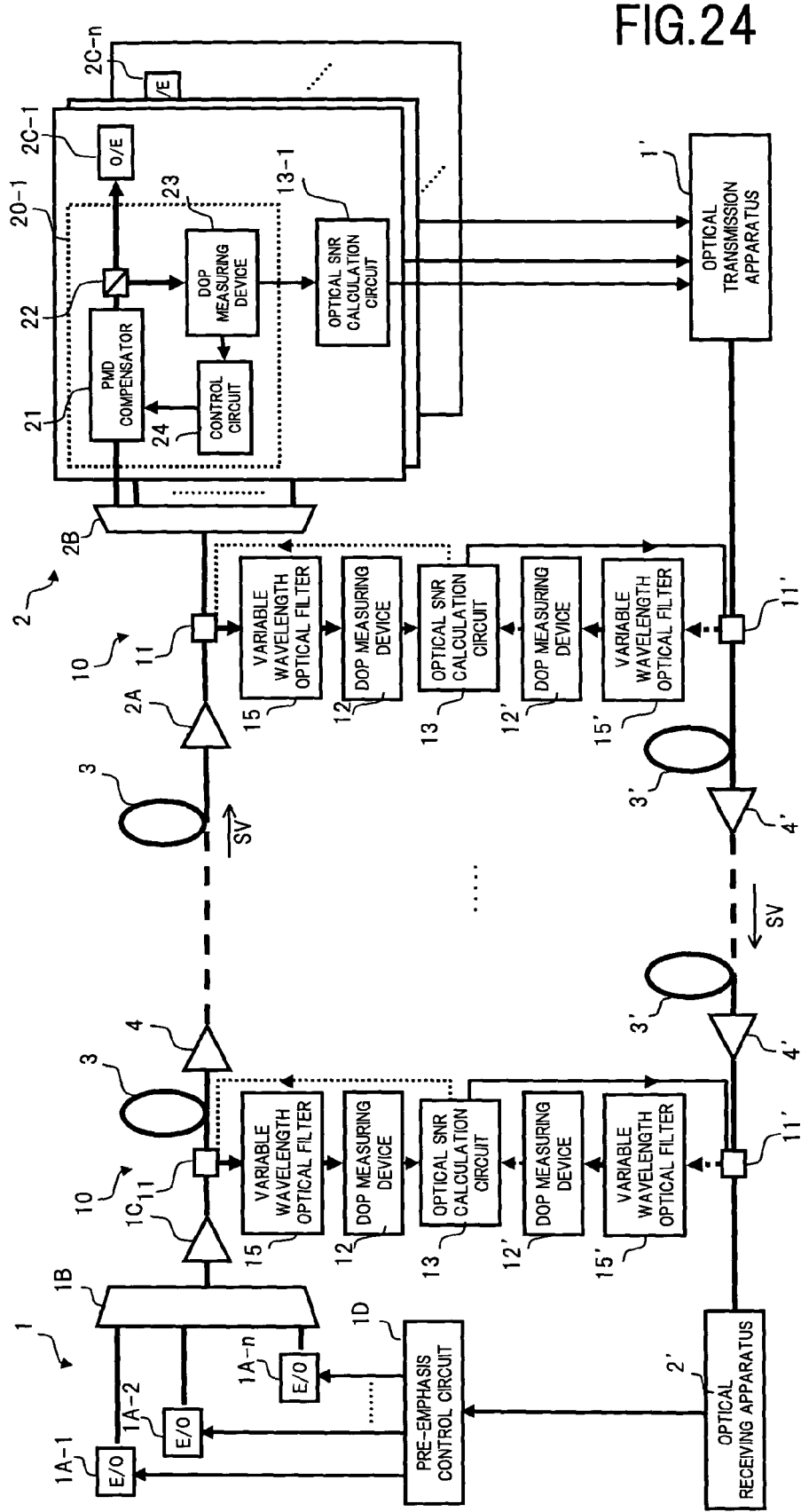
FIG. 24 is a block diagram showing a seventh embodiment of the optical transmission system to which the optical SNR monitoring method of the present invention is applied.

FIG. 24 is a block diagram showing the optical transmission system of the seventh embodiment.

A difference in the system configuration shown in FIG. 24 from the system configuration of the sixth embodiment shown in FIG. 21 is that the optical receiving apparatus 2 is provided with the automatic PMD compensation apparatuses 20-1 to 20-n corresponding to respective wavelengths of the WDM light, and the optical SNRs corresponding to respective wavelengths monitored by the optical SNR calculation circuits 13-1 to 13-n are fed back to the optical transmission apparatus 1 via the opposed links based on the degree of polarization measured for dynamic PMD compensation. Here, the configuration of this optical receiving apparatus 2 corresponds to the configuration of the optical receiving apparatus shown in FIG. 14.

In the multi-repeater WDM optical transmission system with the above configuration, the optical SNRs of the optical signals of respective wavelengths are monitored based on the degrees of polarization measured by the automatic PMD compensation apparatuses 20-1 to 20-n, and the information about each optical SNR is fed back to the optical transmission apparatus 1 via the opposed links, thus the pre-emphasis control of the transmitted light power is performed. As a result, the polarizations and optical SNRs of the optical signals of respective wavelengths are monitored by a simple configuration, thus enabling PMD compensation of the received light and the pre-emphasis control of the transmitted light to be stably performed with high accuracy.

Figure 25:
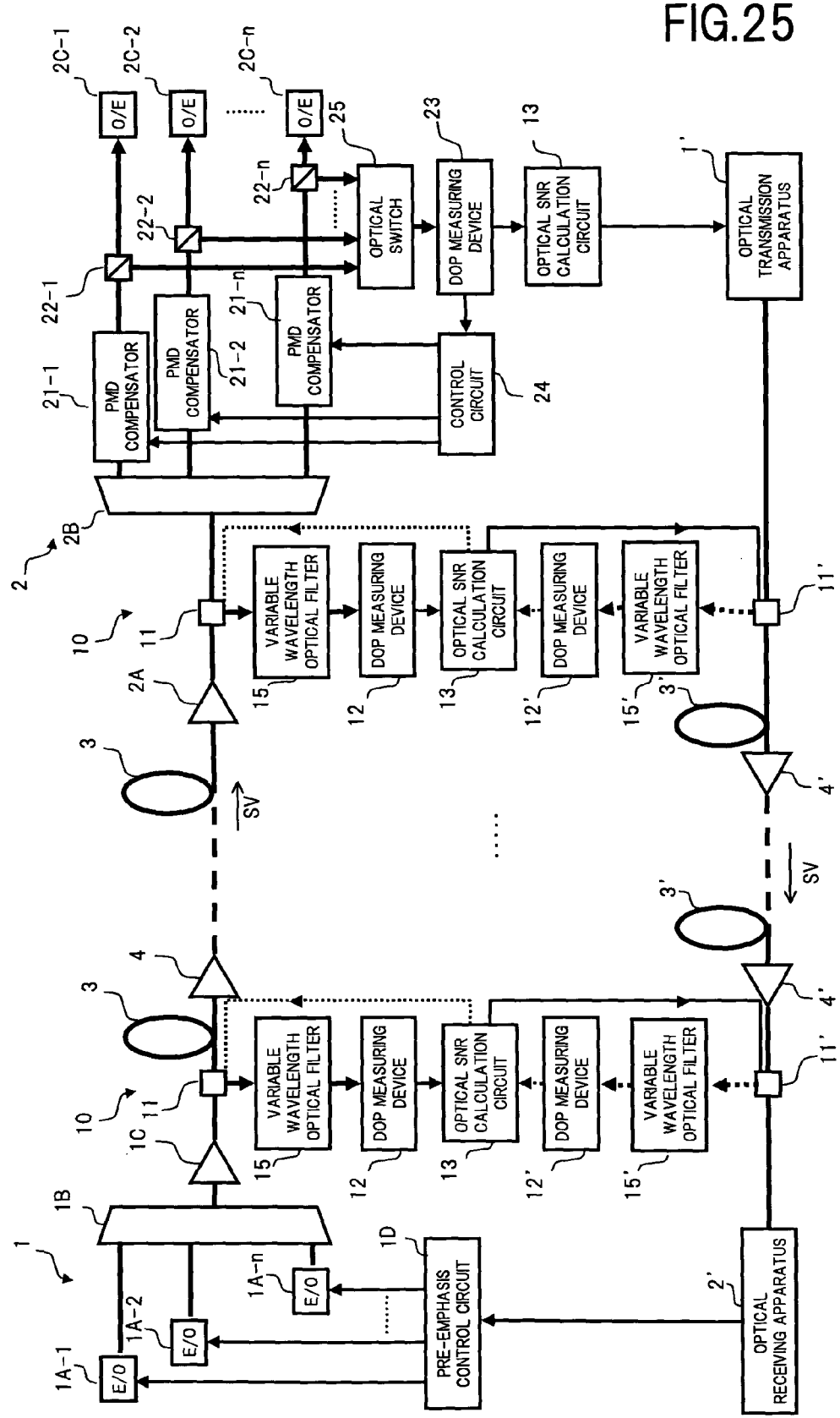
FIG. 25 shows a configuration example of the case where an automatic PMD compensation apparatus utilizing an optical switch is used in conjunction with the seventh embodiment.

In the seventh embodiment, the automatic PMD compensation apparatuses 20-1 to 20-$n$ and the optical SNR calculation circuits 13-1 to 13-$n$ corresponding to respective wavelengths are provided in the optical receiving apparatus 2. However, similarly to the configuration shown in FIG. 15, an automatic PMD compensation apparatus 20 in which the degree of polarization corresponding to each wavelength is measured by the DOP measuring device 23 shared using the optical switch 25 may be provided in the optical receiving apparatus 2. FIG. 25 shows a configuration example of this case.

Figure 26:
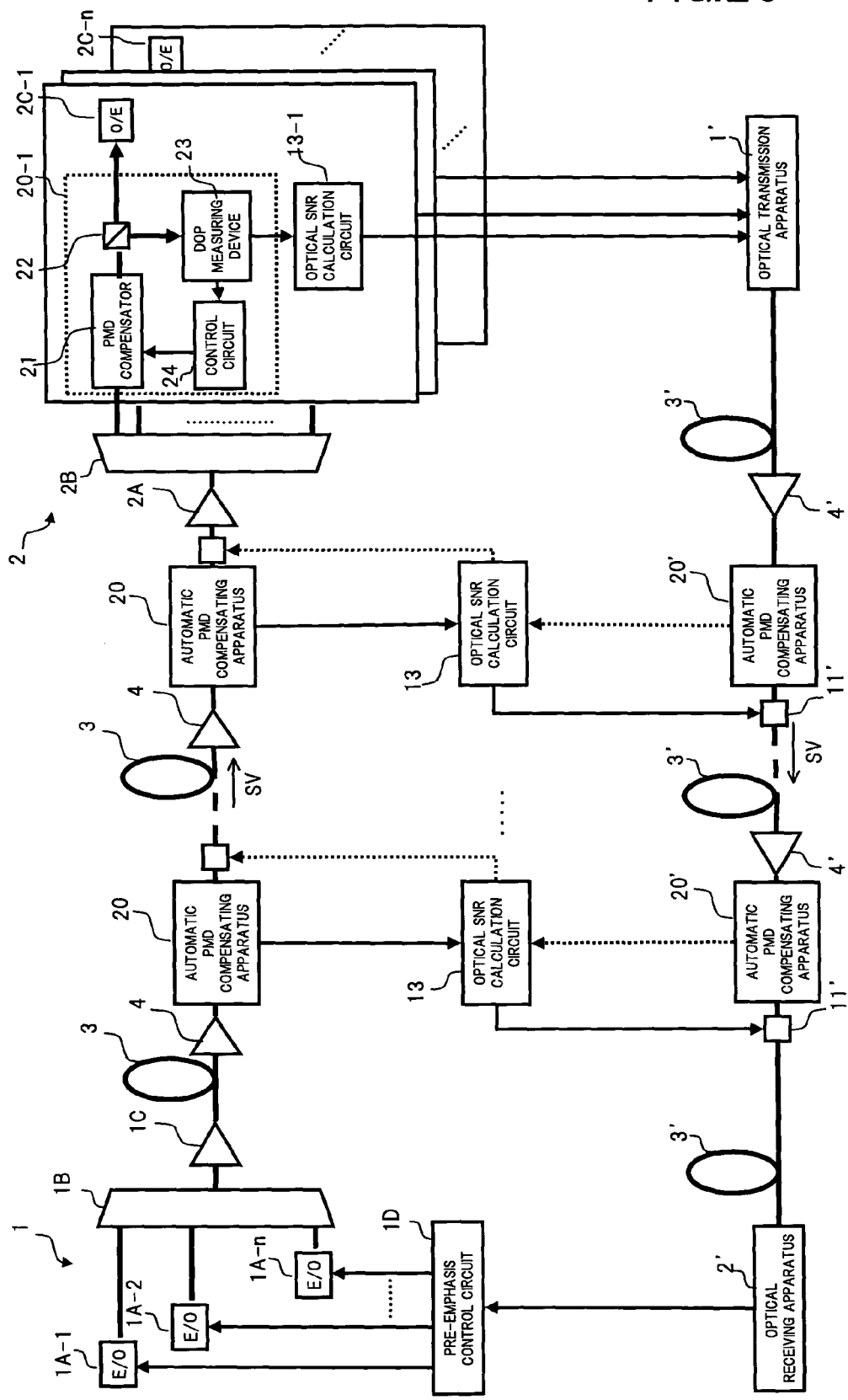
FIG. 26 shows a configuration example of the case where PMD compensation is performed at each repeating interval in the system of FIG. 24.
Figure 27:
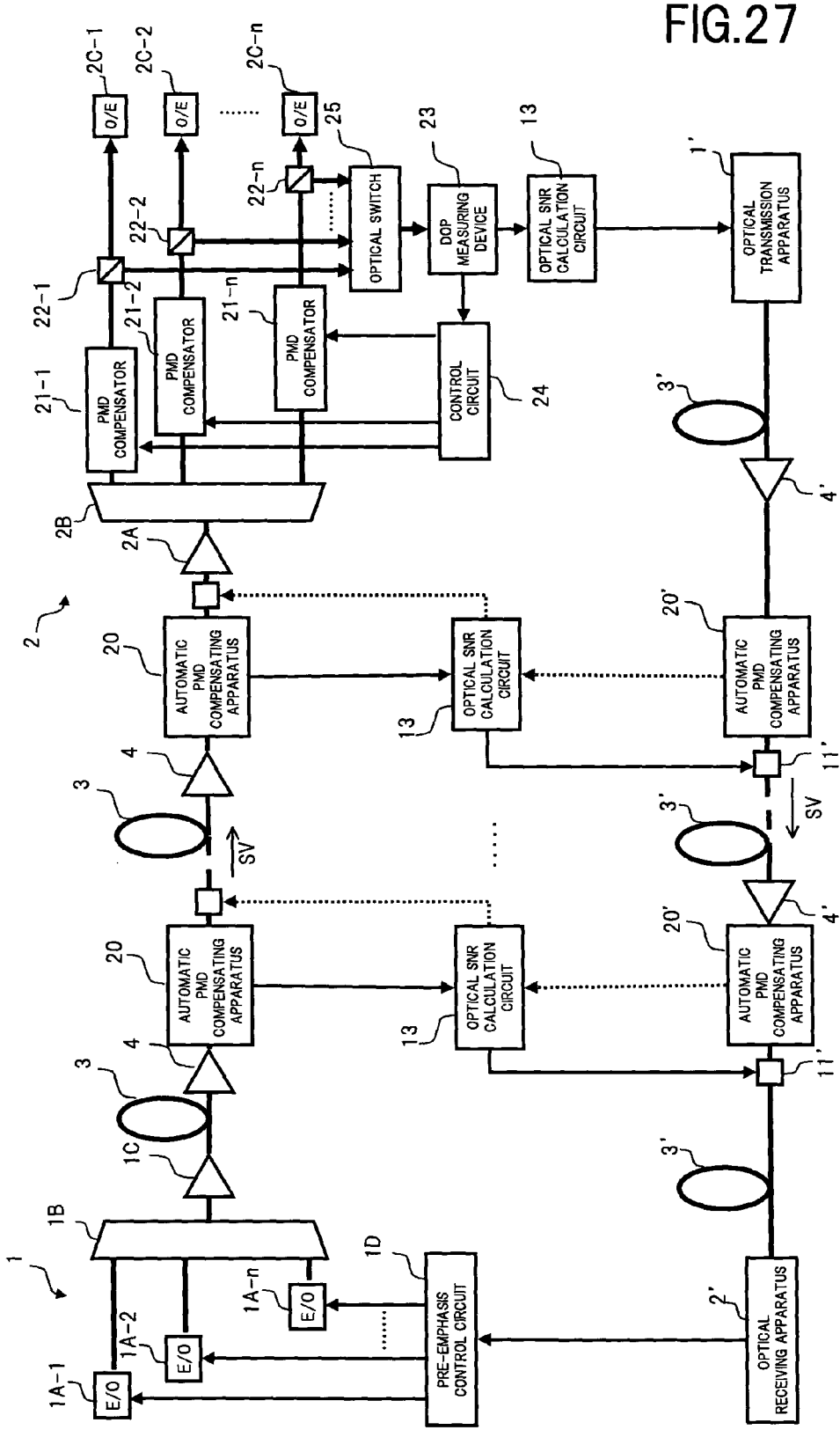
FIG. 27 shows a configuration example of the case where PMD compensation is performed at each repeating interval in the system of FIG. 25.

Furthermore, in the seventh embodiment, a case is described in which the PMD generated in the transmitted light of each wavelength is compensated in the optical receiving apparatus 2 dynamically, and PMD compensation is not performed in each repeating interval. However, as shown in FIG. 26 and FIG. 27, the configuration may be such that automatic PMD compensation apparatuses 20 and 20' are arranged in each repeating interval to perform dynamic PMD compensation, to feed back to the optical transmission apparatuses 1 and 1' via the opposed links, the optical SNRs monitored, based on the degrees of polarization measured by the automatic PMD compensation apparatuses in the respective repeating intervals, by the optical SNR calculation circuit 13 shared by the uplink and the downlink. Here, the configuration shown in FIG. 26 is an example equivalent to FIG. 24, and the configuration shown in FIG. 27 is an example corresponding to FIG. 25.

What is claimed is:

1. An optical transmission system in which an optical signal is transmitted from an optical transmission apparatus to an optical receiving apparatus via an optical transmission path, comprising:
    a degree of polarization measurement section that measures a degree of polarization of said optical signal; and
    an optical SNR calculation section that stores an initial value of said degree of polarization of said optical signal, and determines a change amount in an optical signal to noise ratio of said optical signal according to a change between a measured value of the degree of polarization obtained in said degree of polarization measuring section relative to said stored initial value, wherein
    said degree of polarization measurement section that measures said degree of polarization of said optical signal after a predetermined amount of time has elapsed from a time when said initial value was stored, and
    said predetermined amount of time is set so that said degree of polarization measurement section to measure the change in said degree of polarization due to a change in the optical signal to noise ratio, when a change in said degree of polarization due to a change in a polarization mode dispersion is compensated.

2. An optical transmission system according to claim 1, wherein said degree of polarization measurement section measures the degree of polarization of an optical signal propagated through said optical transmission path to be input to said optical receiving apparatus.

3. An optical transmission system according to claim 1, further comprising;
    at least one optical repeater on said optical transmission path,
    wherein, when an optical signal sent from said optical transmission apparatus is transmitted through a plurality of repeating intervals to be received by said optical receiving apparatus,
    said degree of polarization measurement section measures the degree of polarization of at least one optical signal among an optical signal output from said optical transmission apparatus, each optical signal propagated through each of the repeating intervals and an optical signal input to said optical receiving apparatus.

4. An optical transmission system according to claim 1, wherein, when a wavelength division multiplexed light containing a plurality of optical signals with different wavelengths is transmitted,
    said degree of polarization measurement section measures the degrees of polarization of optical signals of respective wavelengths contained in said wavelength division multiplexed light, and
    said optical signal to noise ratio calculation section determines change amounts in optical signal to noise ratios corresponding to respective wavelengths by using measured values of the degrees of polarization obtained by said degree of polarization measurement section.

5. An optical transmission system according to claim 4, wherein said degree of polarization measurement section and said optical signal to noise ratio calculation section are provided in plural number for each of the optical signals of respective wavelengths contained in said wavelength division multiplexed light.

6. An optical transmission system according to claim 4, further comprising;
    a selection section that selects one optical signal from the optical signals of respective wavelengths contained in said wavelength division multiplexed light,
    wherein said degree of polarization measurement section measures the degree of polarization of an optical signal selected by said selection section, and
    said optical signal to noise ratio calculation section determines a change amount in an optical signal to noise ratio of the optical signal selected by said selection section, by using the measured value of the degree of polarization obtained by said degree of polarization measurement section.

7. An optical transmission system according to claim 6, wherein said selection section includes
    a demultiplexer demultiplexing said wavelength division multiplexed light according to wavelength, and
    an optical switch selecting one optical signal out of the optical signals of respective wavelengths demultiplexed by said demultiplexer to feed it to said degree of polarization measurement section.

8. An optical transmission system according to claim 6, wherein said selection section includes a variable wavelength optical filter extracting an optical signal of one wavelength from said wavelength division multiplexed light, to feed it to said degree of polarization measurement section.

9. An optical transmission system, comprising:
    an automatic polarization mode dispersion compensation apparatus including
        a polarization mode dispersion compensator compensating for polarization mode dispersion generated in said optical signal,
        a degree of polarization measuring device measuring the degree of polarization of an optical signal whose polarization mode dispersion has been compensated by said polarization mode dispersion compensator, and
        a control circuit controlling a compensation amount in said polarization mode dispersion compensator, based on a measured result of said degree of polarization measuring device; and
    an optical signal to noise ratio calculation section which determines a change amount in an optical signal to noise ratio of said optical signal, by using the measured value of the degree of polarization obtained by the degree of polarization measuring device in said automatic polarization mode dispersion compensation apparatus after a predetermined amount of time has elapsed from a time when said initial value was stored, the predetermined amount of time being set to ensure that the polarization measuring device measures the change in said degree of polarization due only to a change in the optical signal to noise ratio, while a change in said degree of polarization due to a change in a polarization mode dispersion is compensated.

10. An optical transmission system according to claim 1, further comprising;
a control section controlling power of an optical signal output from said optical transmission apparatus, based on the optical signal to noise ratio determined by said optical signal to noise ratio calculation section, so that the optical signal to noise ratio of the optical signal received by said optical receiving apparatus is a previously set value.

11. An optical transmission system according to claim 10, wherein, when a wavelength division multiplexed light containing a plurality of optical signals with different wavelengths is transmitted,
said control section performs a pre-emphasis control of the optical signal power of each wavelength output from said optical transmission apparatus, based on the change amount in the optical signal to noise ratio corresponding to each wavelength determined by said optical signal to noise ratio calculation section.

* * * * *